United States Patent
Owechko

(10) Patent No.: US 10,402,675 B2
(45) Date of Patent: Sep. 3, 2019

(54) 2D VEHICLE LOCALIZING USING GEOARCS

(71) Applicant: The Boeing Company, Chicago, IL (US)

(72) Inventor: Yuri Owechko, Newbury Park, CA (US)

(73) Assignee: The Boeing Company, Chicago, IL (US)

(*) Notice: Subject to any disclaimer, the term of this patent is extended or adjusted under 35 U.S.C. 154(b) by 78 days.

(21) Appl. No.: 15/252,120

(22) Filed: Aug. 30, 2016

(65) Prior Publication Data

US 2018/0061055 A1    Mar. 1, 2018

(51) Int. Cl.
*G06K 9/46*    (2006.01)
*G06T 17/05*    (2011.01)
(Continued)

(52) U.S. Cl.
CPC ............ *G06K 9/4604* (2013.01); *G06T 7/344* (2017.01); *G06T 7/75* (2017.01); *G06T 17/05* (2013.01);
(Continued)

(58) Field of Classification Search
CPC ................. G06T 17/05; G06T 7/344; G06T 2207/30252; G06T 7/75; G06T 5/006;
(Continued)

(56) References Cited

U.S. PATENT DOCUMENTS 6,219,444 B1   4/2001   Shashua et al.
6,393,162 B1 *   5/2002   Higurashi ............... G06T 5/006
                                                                    345/629
(Continued)

FOREIGN PATENT DOCUMENTS

EP    2660777 A2   11/2013
EP    2660777 A3   11/2016

OTHER PUBLICATIONS

William B. Thompson, Bonnie H. Bennett, and Karen T. Sutherland, "Geometric reasoning for Map-based Localization," University of Utah, Department of Computer Science Tech. Report UUCS-96-005, pp. 1-23, May 29, 1996.
(Continued)

*Primary Examiner* — Jingge Wu
(74) *Attorney, Agent, or Firm* — Kolisch Hartwell, P.C.

(57) ABSTRACT

Examples include methods, systems, and articles for localizing a vehicle relative to an imaged surface configuration. Localizing the vehicle may include selecting pairs of features in an image acquired from a sensor supported by the vehicle having corresponding identified pairs of features in a reference representation of the surface configuration. A three-dimensional geoarc may be generated based on an angle of view of the sensor and the selected feature pair in the reference representation. In some examples, a selected portion of the geoarc disposed a known distance of the vehicle away from the portion of the physical surface configuration may be determined. Locations where the selected portions of geoarcs for selected feature pairs overlap may be identified. In some examples, the reference representation may be defined in a three-dimensional space of volume elements (voxels), and voxels that are included in the highest number of geoarcs may be determined.

17 Claims, 12 Drawing Sheets

(51) Int. Cl.
*G06T 7/33* (2017.01)
*G06T 7/73* (2017.01)

(52) U.S. Cl.
CPC .............. *G06T 2207/10044* (2013.01); *G06T 2207/30244* (2013.01); *G06T 2207/30252* (2013.01)

(58) Field of Classification Search
CPC .... G06T 7/044; G06K 9/4604; G06K 9/6211; G06K 9/00798
See application file for complete search history.

(56) References Cited

U.S. PATENT DOCUMENTS

| | | | |
|---|---|---|---|
| 6,661,914 B2 | 12/2003 | Dufour | |
| 6,819,779 B1* | 11/2004 | Nichani | G06K 9/00798 382/104 |
| 7,580,591 B2 | 8/2009 | Oldroyd | |
| 8,855,442 B2 | 10/2014 | Owechko | |
| 9,327,406 B1* | 5/2016 | Hinterstoisser | B25J 9/1697 |
| 9,501,700 B2* | 11/2016 | Loveland | G06K 9/00637 |
| 9,679,227 B2* | 6/2017 | Taylor | G06K 9/6292 |
| 9,756,280 B2* | 9/2017 | Mourning | H04N 5/9261 |
| 2001/0036302 A1 | 11/2001 | Miller | |
| 2005/0213818 A1* | 9/2005 | Suzuki | G06K 9/4609 382/190 |
| 2008/0013836 A1* | 1/2008 | Nakamura | G06K 9/4642 382/209 |
| 2009/0141966 A1 | 6/2009 | Chen et al. | |
| 2009/0283626 A1 | 11/2009 | Lutke et al. | |
| 2009/0295791 A1 | 12/2009 | Aguera y Arcas et al. | |
| 2009/0315978 A1 | 12/2009 | Würmlin et al. | |
| 2012/0019522 A1 | 1/2012 | Lawrence et al. | |
| 2013/0271607 A1* | 10/2013 | Takahashi | G01S 5/16 348/148 |
| 2013/0287290 A1* | 10/2013 | Owechko | G06T 17/05 382/154 |
| 2015/0206029 A1* | 7/2015 | Chikano | G06K 9/6211 382/201 |

OTHER PUBLICATIONS

William B. Thompson, Carolyn M. Valiquette, Bonnie H. Bennett, and Karen T. Sutherland, "Geometric reasoning under uncertainty for map-based localization," Spatial Cognition and Computation 1: pp. 291-321, Kluwer Academic Publishers, 1999.

Duncan Robertson and Roberto Cipolla, "An Image-Based System for Urban Navigation," in British Machine Vision Conference, 2004, 10 pages.

Noah Snavely, Steven M. Seitz and Richard Szeliski, "Photo Tourism: Exloring Photo Collections in 3D," ACM Transaction on Graphics (SIGGRAPH Proceedings), 25(3), 2006, pp. 835-846.

Wei Zhang and Jana Kosecka, "Image Based Localization in Urban Environments," International Symposium on 3D Data Processing, Visualization and Transmission, 3DPVT 2006, 8 pages.

Grant Schindler, Matthew Brown, and Richard Szeliski, "City-Scale Location Recognition," IEEE Computer Vision and Pattern Recognition, 2007, 7 pages.

Marco Cristani, Alessandro Perina, Umberto Castellani, and Vittorio Murino "Geo-located image analysis using latent representations," IEEE Computer Vision and Pattern Recognition (CVPR) 2008, 8 pages.

James Hays and Alexei A. Efros, "IM2GPS: estimating geographic information from a single image," IEEE Conf. on Computer Vision and Pattern Recognition (CVPR), 2008, 8 pages.

Keith Yu Kit Leung, Christopher M. Clark and Jan P. Huissoon, "Location in Urban Environments by Matching Ground Level Video images With an Aerial Image," ICRA 2008, 6 pages.

Grant Schindler, Panchapagesan Krischnamurthy, Roberto Lublinderman, Yanxi Liu and Frank Dellaer, "Detecting and Matching Repeated Patterns for Automatic Geo-tagging in Urban Environments," CVPR 2008, 7 pages.

Evangelos Kalogerakis, Olga Vesselova, James Hays, Alexei A. Efros, and Aaron Hertzmann, "Image Sequence Geolocation with Human Travel Priors," IEEE International Conference on Computer Vision 2009, 8 pages.

David Crandall, Lars Backstrom, Daniel Huttenlocher and Jon Kleinber, "Mapping the World's Photos," World Wide Web Conference Committee, Apr. 2009: pp. 761-770, Madrid Spain.

Yunpeng Li, Noah Snavely and Daniel P. Huttenlocher, "Location recognition using prioritized feature matching," ECCV 2010, 14 pages.

Jerry Zhang, Aaron Hallquist, Eric Liang, and Avideh Zakhor, "Location-based Image Retrieval for Urban Environments," ICIP 2011, 4 pages.

European Patent Office, Extended European Search Report in European Patent Application No. 17177600.8-1906, dated Sep. 18, 2017, 5 pages.

European Patent Office, Extended European Search Report in European Patent Application No. 18195372.0, dated Jan. 29, 2019, 7 pages.

* cited by examiner

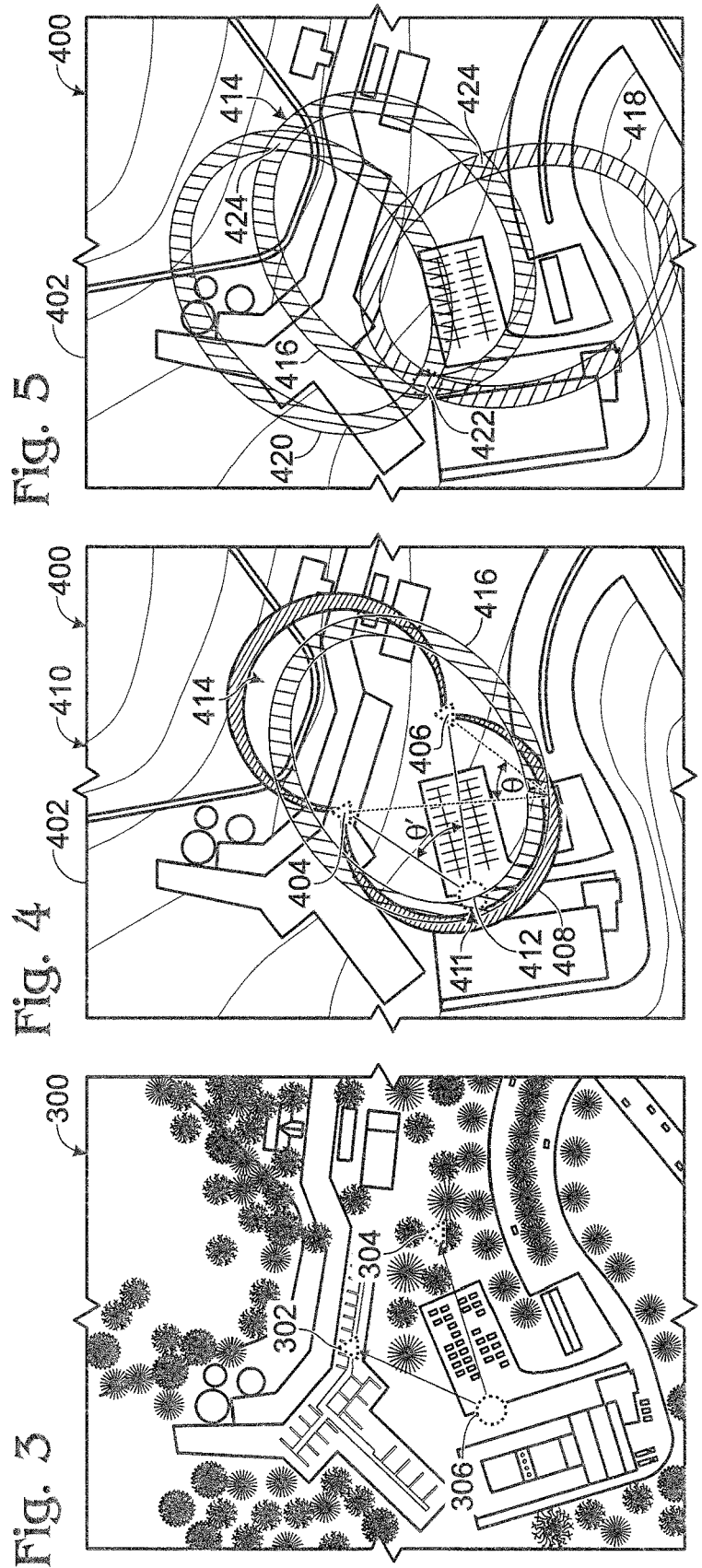

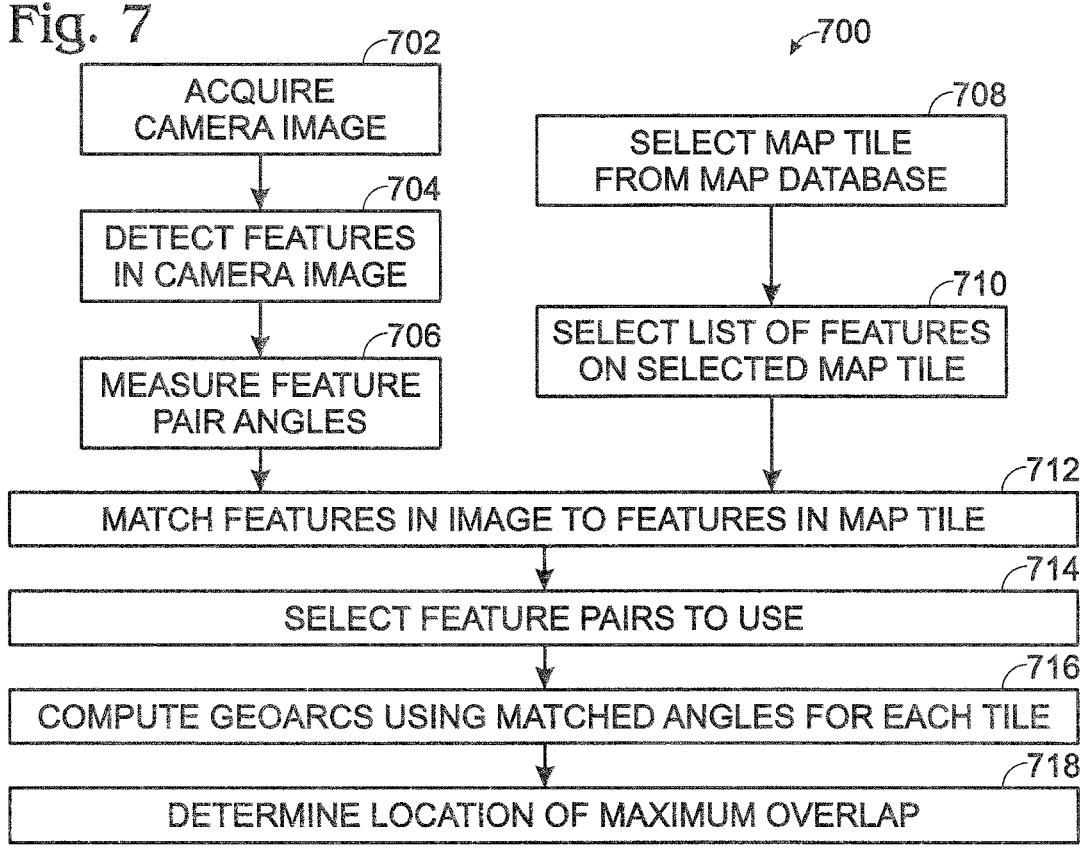
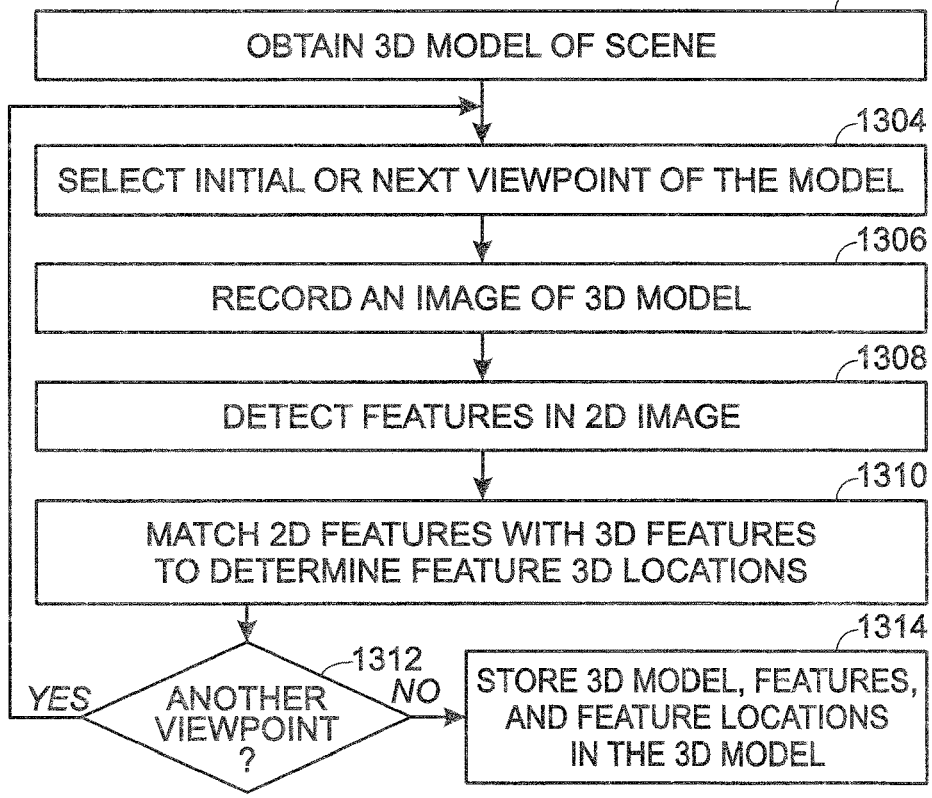

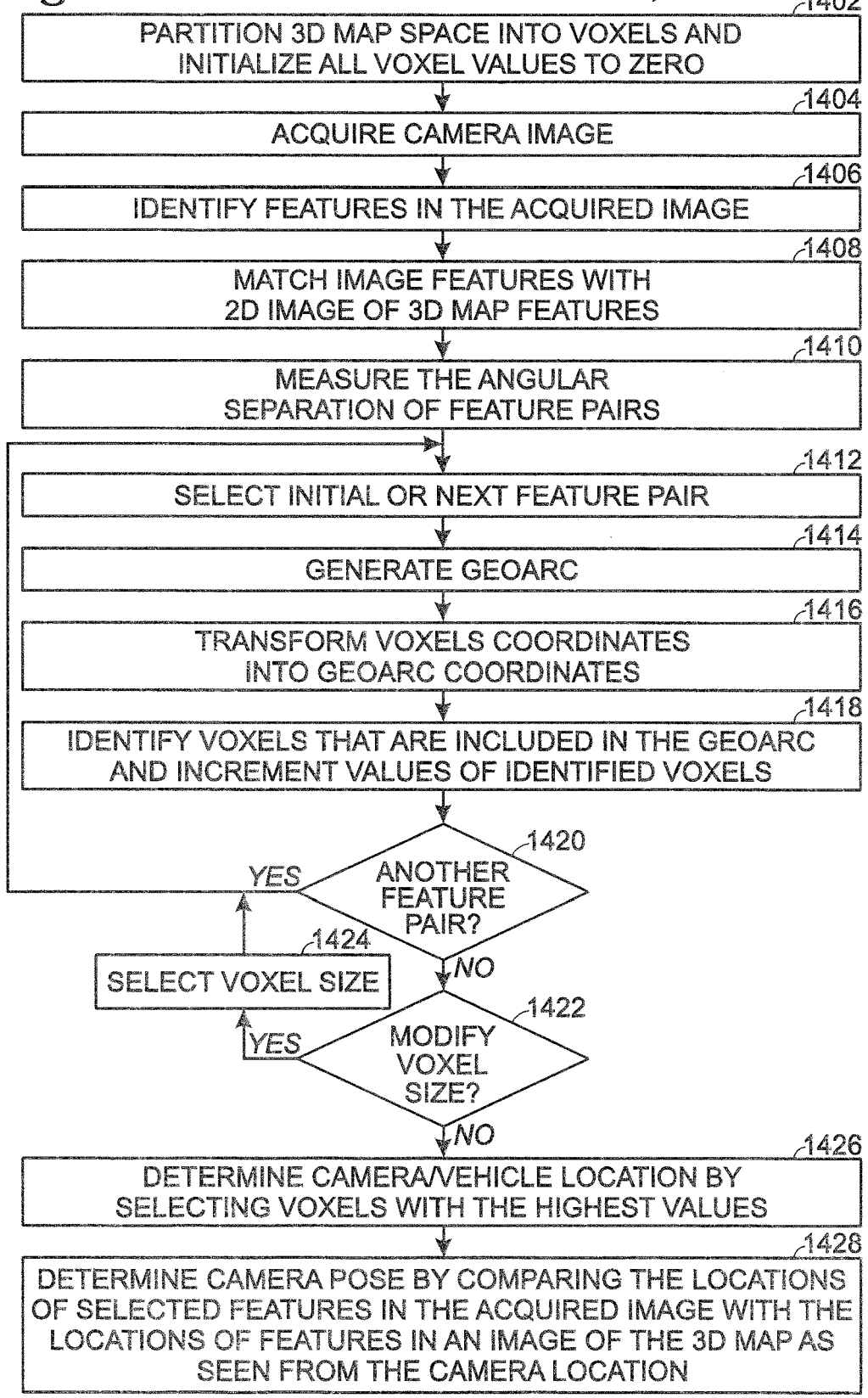

2D VEHICLE LOCALIZING USING GEOARCS

CROSS-REFERENCES

The following related patent is incorporated herein, in its entirety, for all purposes: U.S. Pat. No. 8,855,442 issued to Yuri Owechko on Oct. 7, 2014 for "Image Registration of Multimodal Data Using 3D-Geoarcs."

FIELD

This disclosure relates to methods, systems, and articles for vehicle localizing. More specifically, the disclosed embodiments relate to systems and methods for localizing a vehicle using geoarcs relating a sensor image of a physical surface configuration with a reference representation of the physical surface configuration.

Introduction

Global positioning system (GPS) enabled devices are common for locating the position of such devices within the regions where it is available. For devices that are not GPS enabled or are in a position where GPS is not available, other ways of locating the position of the device are required. Existing approaches for GPS-denied localization use a variety of sensing mechanisms. For example, inertial measurement units (IMU) have been implemented in platforms ranging from guided missiles to cellphones. They are suited for applications that require localization for relatively short periods of time due to the inherent growth in their location estimate error. Active sensing systems use RF emitters in the scene and a spatial map of the RF environment for localization. While such methods are suitable for indoor use, such mapping of active emitter patterns may not be practical outdoors and are inherently non-covert.

Passive camera-based approaches perform localization of a camera by processing image data. A Self Localization and Mapping (SLAM) system creates a three-dimensional (3D) model of the environment and estimates the camera position relative to the model by exploiting movement of the camera. SLAM does not provide absolute position information and requires separate means for registering the model with a 3D map. It is also computationally complex relative to other methods, especially when only two-dimensional (2D) position information is required.

Scene matching methods match camera imagery with geotagged imagery in a large database and then infer the location and pose of the camera. The image matching is done by finding feature to feature correspondences between the camera image and candidate map imagery. Such methods are computationally complex and error prone due to the need to match many individual features and are sensitive to matching errors. Correlation-based approaches are sensitive to rotation, scale, perspective, and lighting variations and cannot correct large variations from the flight path. Semantic localization methods recognize objects in camera imagery and use semantic reasoning to match a scene with objects in a map database. These methods are limited by the accuracy of recognition methods which to-date do not generalize well across different datasets and environmental changes, and have limited spatial accuracy, especially in 3D.

SUMMARY

The present disclosure describes examples of methods, systems, articles, techniques, and/or solutions for locating or localizing a vehicle relative to an imaged surface configuration, which is particularly useful when other techniques for localizing the vehicle are not available. In some embodiments, a method for spatial localization includes acquiring from a sensor an image of a portion of a physical surface configuration from a position spaced away from the physical surface configuration by a known distance and identifying features in the acquired image. The method further includes associating identified features in the acquired image with identified features in a reference representation, such as a reference map, of the portion of the physical surface configuration, and selecting a plurality of pairs of features in the acquired image having corresponding identified pairs of features in the reference representation. For each selected feature pair in the acquired image, the method includes determining an angle of view between the pair of features from the sensor, generating a three-dimensional geoarc associating the determined angle of view and the selected feature pair in the reference representation, and determining a selected portion of the geoarc disposed the known distance away from the portion of the physical surface configuration. The method also includes identifying locations where the selected portions of the geoarcs for the selected feature pairs overlap. The location with the maximum number of overlapping geoarcs corresponds to the camera location.

In some embodiments, a vehicle includes a sensor configured to produce an image of a portion of a physical surface configuration from a position spaced away from the physical surface configuration by a known distance and a data processing system communicatively coupled to the sensor. The data processing system is configured to store a reference representation of the portion of the physical surface configuration and features identified in the reference representation and identify features in the acquired image. The data processing system is configured to associate identified features in the acquired image with identified features in the reference representation, and select a plurality of pairs of features in the acquired image having corresponding identified pairs of features in the reference representation. For each selected feature pair in the acquired image, the data processing system is configured to determine an angle of view between the pair of features from the sensor, generate a three-dimensional geoarc associating the determined angle of view and the selected feature pair in the reference representation, and determine a selected portion of the geoarc disposed the known distance away from the portion of the physical surface configuration. The data processing system is also configured to identify locations where the selected portions of the geoarcs for the selected feature pairs overlap. The location with the maximum number of overlapping geoarcs corresponds to the camera location.

In some embodiments, a computer program product, includes at least one computer readable storage medium having computer readable program instructions embodied therewith. The computer readable program instructions, when executed by a processor, configure the processor to store a reference representation of the portion of the physical surface configuration and features identified in the reference representation, and receive and store an image produced by a sensor of a portion of a physical surface configuration from a position spaced away from the physical surface configuration by a known distance. The computer readable program instructions, when read by the processor further configure the processor to identify features in the received image, associate identified features in the acquired image with identified features in the reference representation, and select a plurality of pairs of features in the received image having corresponding identified pairs of features in the reference representation. For each selected feature pair in the received image, the computer readable program instructions, when read by the processor further configure the processor to determine an angle of view between the pair of features from the sensor, generate a three-dimensional geoarc associating the determined angle of view and the selected feature pair in the reference representation, and determine a selected portion of the geoarc disposed the known distance away from the portion of the physical surface configuration. The computer readable program instructions, when read by the processor also configure the processor to identify locations where the selected portions of the geoarcs for the selected feature pairs overlap. The location with the maximum number of overlapping geoarcs corresponds to the camera location.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 3 is an example of an image of a physical surface configuration and an illustration of a sensor angle of view.

FIG. 4 is an example of portions of a geoarc in a ground plane and in a translated sensor plane relative to a reference representation of a physical surface configuration.

FIG. 5 is similar to FIG. 4, but showing portions of three geoarcs in a translated sensor plane relative to the reference representation.

FIG. 7 is an illustration of operations performed by an embodiment for locating a vehicle having an image sensor.

FIG. 13 is an illustration of operations performed by an embodiment for generating a feature reference map.

FIG. 14 is an illustration of operations performed by an embodiment for locating a vehicle having an image sensor.

DESCRIPTION

Overview

Figure 1:
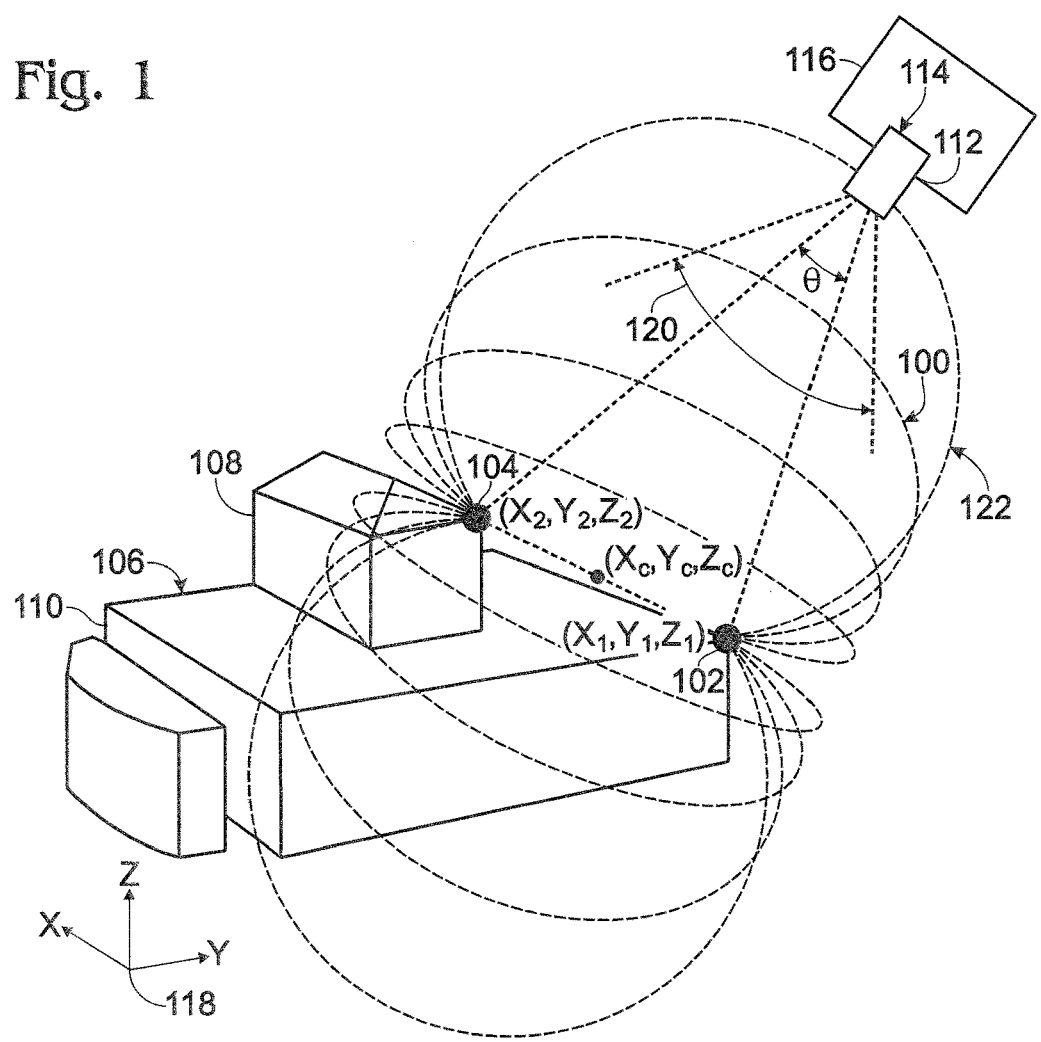
FIG. 1 is an example of a three-dimensional geoarc based on two features of a representation of a physical surface configuration.

Various embodiments of systems and methods for locating or localizing a vehicle having an image sensor using geoarcs relating a sensor image of a physical surface configuration with a reference representation of the physical surface configuration are described below and illustrated in the associated drawings. Unless otherwise specified, a vehicle-localizing system and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other vehicle-locating systems. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Spatial localization systems may be used in an environment where a physical surface configuration, including one or more physical surfaces or a group of physical surface elements or features, whether or not connected, is spaced from the location where a sensor has produced an image of the physical surface configuration. Examples of spatial localizations include an indoor environment, an outdoor environment near the earth or other planet surface, positions in the earth atmosphere, and positions in space. For example, a space vehicle approaching a space station may use a spatial localization system. Thus, a spatial localization system is also applicable to an aerial platform that needs a passive geolocation method for augmenting or replacing GPS geolocation when the GPS signal is obstructed, jammed, or spoofed. A spatial localization system may also be used for autonomous aerial platforms including unmanned aerial vehicles (UAVs), missiles, and loitering munitions. A spatial localization system may also be used for indoor navigation, and applies to land, water, air and space vehicle localization.

In some examples, a spatial localization system may be particularly beneficial when used as a geoarc aerial localization system (GALS) for passive geolocation under GPS-denied conditions using an aerial camera. GALS performs localization by detecting features in images of the ground and measuring the observed angles between them using the camera. By assigning a measured angle value to a mapped feature pair in a map, a torus can be drawn in a 3D map space that constrains the possible location of the camera in three dimensions, such as in x, y, and z dimensions in a Cartesian coordinate system, to be on its surface. Other types of coordinate systems may also be used, and are considered equivalent to a Cartesian coordinate system. If the height of the aerial camera above the ground is known, for example, then the camera location can be further restricted to lie on the intersection of the torus surface with a plane at the camera height that is parallel to the ground. By projecting this intersection to the ground, a 2D geoarc figure can be drawn on the map. Uncertainty in localization due to errors in angle measurements may be represented by using a 2D geoarc of nonzero thickness. By accumulating additional constraints from multiple 2D geoarcs using simple addition, the camera location and pose can be estimated with increasing accuracy.

The accumulation of geoarcs in GALS acts like a "matched location filter" that spreads the effects of errors due to angle feature pair mismatches over the map while building up a signal at the true location as more angles are measured and assigned to map feature pairs. This makes GALS very robust against errors in feature matching and avoids the need for exhaustive searching of all possible angle to feature pair assignments. GALS also provides continuous updating of the localization accuracy and confidence. A low proportion of correct image-to-map feature correspondences may still result in high accuracy localization. In addition, by using conventional scale and rotation invariant features such as scale-invariant feature transform (SIFT) or speeded up robust features (SURF), the GALS localization process is also scale and rotation invariant, which also increases robustness and processing speed.

The GALS framework may use graphic operations that can be implemented with low size, weight, and power using multi-core graphics chips, such as those developed for cellphones and tablets. By dividing the map into tiles and assigning each tile to a separate core, the speedup in "dropped-in" localization (e.g. without knowledge of a previous location) will be linear in the number of cores because each map tile can be processed independently of other tiles.

In some examples, a 3D spatial localization system may be used for determining a location and pose of a camera in 3D space relative to a 3D object using angles measured between features on the object that are observed by the camera. The visual features can be in arbitrary locations in 3D space and do not need to be confined to a plane. By assigning a measured angle value to a mapped feature pair in a map, a spindle torus can be drawn in a 3D map space that constrains the possible locations of the camera in x, y, and z coordinate space to be on its surface. Uncertainty in localization due to errors in angle measurements may be represented with a nonzero thickness of the 3D geoarc. By accumulating additional constraints from multiple 3D geoarcs, each associated with a pair of features, the camera location and pose in 3D can be estimated with increasing accuracy. By dividing the 3D space into voxels and using a population function to represent overlaps of the 3D geoarcs, the camera location and pose can be efficiently determined. This solution is particularly useful when the altitude of a vehicle having the image sensor is unknown.

The accumulation of 3D geoarcs implements what may be termed a 3D location matched filter that spreads the effects of errors due to angle-feature pair mismatches over the 3D space while building up a signal at the camera location as more angles are measured and assigned to object feature pairs. This makes 3D geoarcs very robust against errors in feature matching and avoids the need for exhaustive searching of all possible angle-to-feature-pair assignments. The use of 3D geoarcs also provide continuous updating of the localization accuracy and confidence. In addition, by using scale and rotation invariant features such as SIFT or SURF the complete 3D localization process is scale and rotation invariant, which also increases robustness and processing speed.

A 3D spatial localization system may include a determination as to whether a 3D point is inside or outside a 3D geoarc, which determination can be implemented with low size, weight, and power and in parallel using multi-core graphics chips, such as those developed for cellphones and tablets. Such a spatial localization system may be used in space platforms that need to dock or navigate around 3D objects in space, as well as for autonomous aerial platforms including UAVs, missiles, and loitering munitions that need to navigate around 3D objects and environments where GPS is not available or not accurate enough. A 3D spatial localization system could also be used for indoor or outdoor navigation using, for example, cellphone cameras.

Aspects of a spatial localization system may be embodied as a computer method, computer system, or computer program product. Accordingly, aspects of the spatial localization system may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the spatial localization system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the spatial localization system may be written in one or any combination of programming languages, including an object-oriented programming language such as Java, Smalltalk, C++, and/or the like, and conventional procedural programming languages, such as the C programming language. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of spatial localization systems are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block or blocks.

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products according to aspects of a spatial localization system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.
Definition A geoarc as used herein refers to a mathematical model associating a determined angle of view and a selected feature pair in a reference representation of a physical surface configuration, whether or not the physical surface configuration is geographical in character. An exemplary geoarc used herein is a self-intersecting or spindle torus having a surface or volume that represents the locus of points that view two points in space with a common angle of view or range of angles of view.

EXAMPLES, COMPONENTS, AND ALTERNATIVES

The following sections describe selected aspects of exemplary spatial localization systems and/or methods. The examples in these sections are intended for illustration and should not be interpreted as limiting the entire scope of the present disclosure. Each section may include one or more distinct inventions, and/or contextual or related information, function, and/or structure.

Example 1

This first example of a method of spatial localization that may be embodied in a geoarc localization system (GALS) uses images to find the location of a vehicle having an image sensor, such as a camera, using observed angles between features detected in the image. This angle is determined from the camera parameters, such as field of view relative to the positions of the features in the image. The distance between two features in the image has a direct relationship to the observed angle between them. Assigning a measured angle to a mapped feature pair restricts the possible (x, y, z) coordinate position of the camera in world coordinates to be on the surface of a self-intersecting or spindle torus 100 as illustrated in FIG. 1. Torus 100 is generated from the positions of two identified features 102, 104 that are identified on a reference representation of at least a portion of a physical surface configuration 106. The reference representation may be stored reference map or model of the physical surface configuration or portion of the physical surface configuration, or it may be a stored reference image of the physical surface configuration or portion of the physical surface configuration. In this example, a portion of physical surface configuration 106 included in the reference representation as well as a sensor image of the portion of physical surface configuration 106 includes a building 108 having a corner forming first feature 102. Building 108 is supported on a structure 110, such as another building or land mass, having second feature 104. Such physical structures may or may not be components of a common physical structure.

A camera 112 or other image sensor 114 supported by a vehicle 116 spaced away from physical surface configuration 106 produces a sensor image of physical surface configuration 106. A reference representation of physical surface configuration 106 is stored in a system memory, along with physical features of the physical surface configuration 106 identified on the reference representation, including the coordinates of the features relative to a general coordinate origin 118 having x, y, and z axes. The positions of physical features 102, 104, forming a feature pair, are identified as $(x_1, y_1, z_1)$ and $(x_2, y_2, z_2)$, respectively. A center point on a line extending between features 102, 104 is identified as $(x_c, y_c, z_c)$.

Camera 112 has a field of view 120. In a sensor image produced by camera 112, physical features 102, 104 may be separated by an angle of view θ. It will be appreciated that torus 100 has a continuous surface 122 illustrated by intermittent lines in FIG. 1. Each point on torus surface 122 has the same angle of view θ, and thereby forms all of the possible positions of camera 112 and vehicle 116, physical surface configuration 106 notwithstanding.

Example 2

Figure 2:
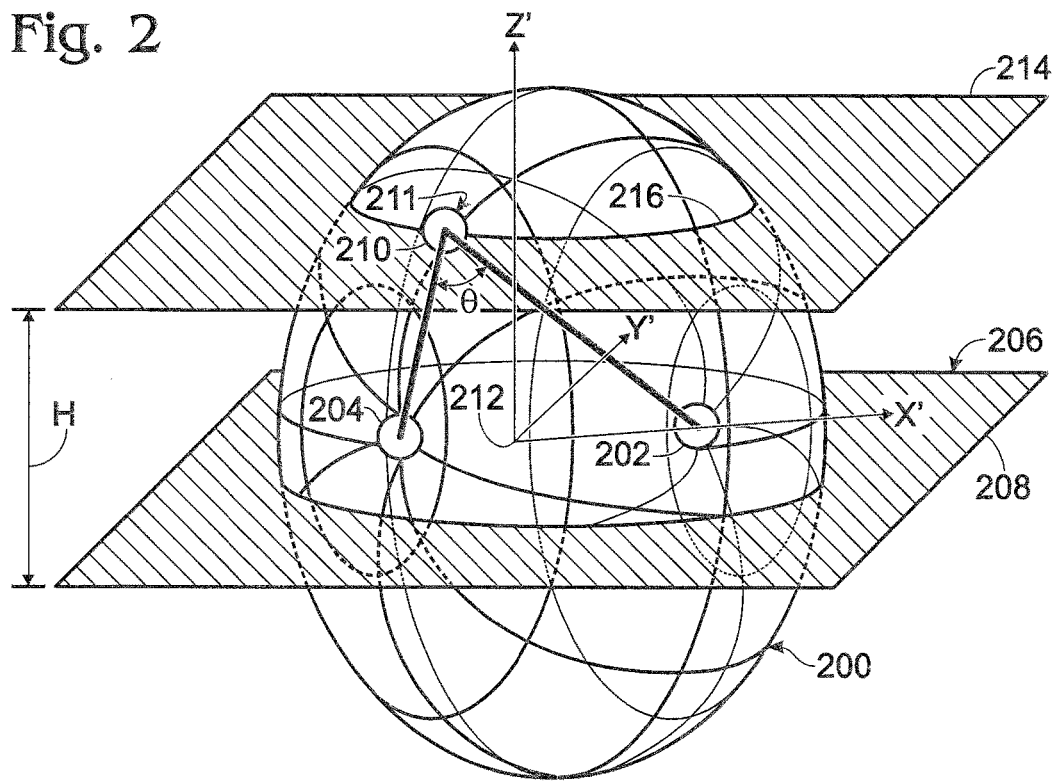
FIG. 2 is an example of a three-dimensional geoarc relative to a ground plane and a sensor plane.

A second example of a geoarc 200 in the form of a spindle torus is illustrated in FIG. 2. Geoarc 200 is generated from the positions of two features 202, 204 that are identified on a sensor image and a reference representation of at least a portion of a physical surface configuration 206, such as the earth surface, disposed on a ground plane 208. This scenario corresponds to a camera 210 disposed on an aerial platform or other vehicle 211 at a known height H above ground plane 208. Geoarc 200 is defined by a coordinate system having an origin 212 at a center point on a line between features 202, 204. With this torus-based coordinate system, an x' axis lies on the line between features 202, 204, a y' axis extends horizontally in ground plane 208 normal to the x' axis, and the z' axis extends vertically away from the ground plane.

The camera and vehicle location is thus restricted to lie on the intersection of a sensor plane 214, disposed at height z'=H, with geoarc 200. Sensor plane 214 is parallel to the ground plane and at the camera and vehicle height. At a height H=0, sensor plane 214 is the same plane as ground plane 208. This intersection is a spiric curve 216. Spiric curve 216 is a portion of geoarc 200 and is expressed analytically based on the positions of features 202, 204 on the reference representation of physical surface configuration 206 and the angle of view θ between features 202, 204 as viewed by camera 210. A determination of the location of camera 210 and vehicle 211 is thus limited to a location on spiric curve 216.

FIGS. 3-5 illustrate the process graphically. FIG. 3 is an illustration of a sensor image 300 showing features 302, 304 identified from landmarks on sensor image 300. Sensor image 300 illustrates an angle of view θ as viewed by camera 306 on a vehicle at a height H above the ground plane.

FIG. 4 illustrates a reference representation 400 of the physical surface configuration that is imaged as sensor image 300 in FIG. 3. In this example, reference representation 400 is a reference map 402 showing features that are also shown in sensor image 300. Reference map 402 has features 404, 406 corresponding to features 302, 304 shown in FIG. 3. A ground-plane 2D geoarc 408 that includes features 404, 406 is disposed in a ground plane 410 represented by reference map 402 in the plane of the figure. Geoarc 408 represents the geoarc if a vehicle 411 supporting a camera 412 was disposed on the physical surface configuration in ground plane 410 and camera 412 had an angle of view θ.

However, as vehicle 411 and camera 412 was disposed at height H, the camera location translated onto ground plane 410 does not necessarily lie on geoarc 408. By projecting a sensor-plane spiric curve 414 onto ground plane 410, as described with reference to torus 200 in FIG. 2, a sensor-plane 2D geoarc 416 is formed on ground plane 410. The shape, size, and orientation of geoarc 416 is determined by the positions of feature pair 404, 406 on reference map 402, the camera height H above the ground, and the observed angle θ between features 404, 406. The projection of spiric curve 414 on ground plane 410 is the set of possible camera locations in (x', y') (on ground plane 410), and which thereby defines sensor-plane 2D geoarc 416 on reference map 402. The angle of view θ is shown as angle of view θ' for geoarc 416, since the two-dimensional representation is not an accurate representation of the true angle of view θ. Uncertainty in localization due to errors in angle measurements is represented by the nonzero thickness of 2D geoarcs 408, 416.

FIG. 5 shows reference map 402 with translated sensor-plane geoarc 416 as well as two additional translated sensor-plane geoarcs 418, 420 generated based on other feature pairs, not identified. The sum of multiple geoarcs determines the location of the vehicle and camera, as shown in FIG. 2. By accumulating additional translated 2D geoarcs, a translated camera/vehicle location 422 can be determined with increasing accuracy and confidence. That is, all three geoarcs shown overlap concurrently at only location 422. Thus, by determining the location on the three geoarcs 416, 418, 420 that exists in the highest number of geoarcs, translated camera/vehicle location 422 is identified. The true camera location is a height H above translated camera/vehicle location 422.

Thus, by assigning respective feature pair angles to multiple map feature pairs, then camera/vehicle location 422 is restricted to be on the intersection of multiple tori. Each torus has a nonzero surface thickness due to the uncertainty in the angle measurement and map feature positions so the intersection is actually a small 2D volume. If all the angles are correctly matched with map feature pairs, then 3 feature pairs formed from 3 features are sufficient to localize the camera. However, since the feature locations and angles can be very variable, the localization accuracy is improved by using more feature pairs. Finding the 3D intersections of multiple tori can be performed efficiently on modern graphics processors, but the computational load can be greatly decreased by eliminating the height or z dimension by measuring the camera height H above ground using another sensor, such as an altimeter or laser rangefinder. The processing is then performed in 2D rather than 3D.

By assigning all pixels of reference representation 400 within each geoarc 416, 418, 420 a fixed value, such as a value of 1, and then adding the values contributed by geoarcs 416, 418, 420, a location signal peak builds up at camera/vehicle location 422. Accidental overlaps will also occur which generate location "noise", such as at geoarc locations 424, but the probability of such overlaps decreases rapidly with the overlap value. Each geoarc provides evidence for a set of possible camera/vehicle locations and the degree of overlap is a measure of confidence for a location.

Example 3

Figure 6:
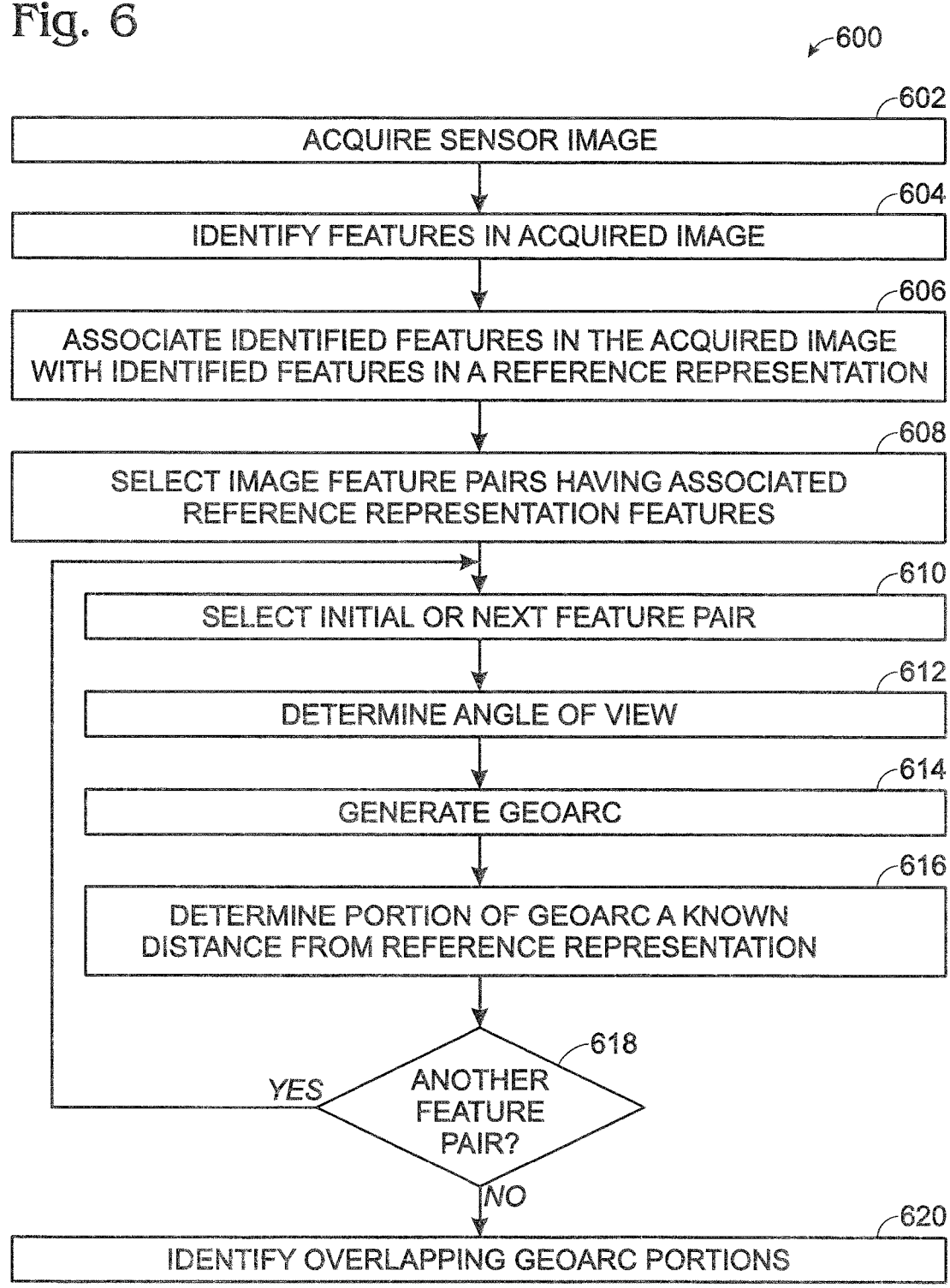
FIG. 6 is an illustration of operations performed by an embodiment for locating a vehicle having an image sensor.

An example of a method 600 for determining spatial location of a vehicle, such as vehicle 116 having an image sensor, such as sensor 114 or camera 112, 210, 306, or 412, is illustrated in FIG. 6. FIG. 6 is a flowchart illustrating operations performed by one embodiment of a spatial locating system in an illustrative method, and may not recite the complete process or all steps of the method. Although various steps of method 600 are described below and depicted in FIG. 6, the steps need not necessarily all be performed, and in some cases may be performed in a different order than the order shown. Method 600 is particularly useful when other techniques for localizing a vehicle are not available Method 600 includes in a step 602 acquiring from sensor 114, such as camera 112, 210, 306, or 412, an image 300 of a portion of a physical surface configuration 106, 206 from a position 422 spaced away from physical surface configuration 106, 206 by known distance H. Features 302, 304 in acquired image 300 are identified in a step 604. The method further includes in a step 606 associating identified features 302, 304 in acquired image 300 with identified features 404, 406 in reference representation 400, 402 of the portion of physical surface configuration 106, 206. A plurality of pairs of features 302, 304 in the acquired image 300 having corresponding identified pairs of features 404, 406 in the reference representation are selected in a step 608. An initial feature pair is selected in step 610. For each selected feature pair in the acquired image 300, the method includes determining in a step 612 an angle of view θ between the pair of features 302, 304 from the sensor (camera 306), generating in a step 614 three-dimensional geoarc 408 associating the determined angle of view θ and the selected feature pair 404, 406 in reference representation 400, and determining in a step 616 a selected portion, such as spiric curve 216 of geoarc 200 or sensor-plane geoarcs 416, 418, 420, disposed known distance H away from the portion of the physical surface configuration (106, 206). A determination is made in a step 618 whether there is another selected feature pair. If there is, steps 610, 612, 614, and 616 are repeated. The method also includes in a step 620 identifying locations 422, 424 where the selected portions of geoarcs 416, 418, 420 for the selected feature pairs overlap.

The localization signal $S_{loc}$ represented by the pixel values that is located at the peak value of the summed geoarc values for each pixel has a value of $$S_{loc}=N_c=m_v(m_v-1)/2.$$

$N_c$ is the number of geoarcs overlapping at a pixel of the reference representation. $m_v$ is the number of features 302, 304 detected in the camera image 300 that are valid, e.g. are features 404, 406 that are in the reference map 402 and are members of feature pairs with correctly assigned measured feature pair angles θ. The probability of $N_c$ geoarcs accidentally overlapping at a random location 424 is the product of the fractional geoarc areas:

$$P_c = \prod_{n=1}^{Nc} \frac{A_n}{L^2}$$

where $L^2$ is the area of an L×L map and $A_n$ is the area of geoarc n. $P_c$ decreases rapidly with $N_c$ while the localization signal $S_{loc}$ increases linearly with $N_c$ and quadratically with the number of valid features.

A simulation was performed in which 50 randomly distributed features were detected in a camera image and then varied the number $m_c$ of them which were correctly matched with a map feature and were members of a feature pair with a correctly assigned angle measurement. $S_{loc}$ was found to be greater than $S_{noise}$ even if only 12 out of 50 features are correctly assigned and there is a high resulting signal-to-noise ratio. Method 600 thus produces reliable results when there are substantial errors in feature detection, matching, and angle assignment. Thus, it is acceptable if a small fraction of the geoarcs are valid, since the localization signal $S_{loc}$ exceeds the noise sign) $S_{noise}$ due to such errors.

Example 4

In some examples, segmentation of a map feature database into divisions reduces the computational load and enables efficient parallelization using multi-core processors. FIG. 7 illustrates an example of a GALS method 700 as an example of spatial localization method 600, shown generally at 600, of spatially locating a vehicle, such as vehicle 116, 411, having an image sensor, such as a camera 306, 412. FIG. 7 is a flowchart illustrating operations performed by one embodiment of a spatial locating system in an illustrative method, and may not recite the complete process or all steps of the method. Although various steps of method 700 are described below and depicted in FIG. 7, the steps need not necessarily all be performed, and in some cases may be performed in a different order than the order shown. As with method 600, method 700 is useful when other techniques for localizing a vehicle are not available Method 700 includes acquiring in a step 702 a camera image 300 of a portion of a physical surface configuration. For example, camera 112, 306, 412 may be an aerial camera that produces a sensor image 300 of the ground below the platform, such as a manned or unmanned aerial vehicle (UAV), drone, or other type of aircraft, and an altimeter or active range-finder is used to determine the height of camera 112, 306, 412 above the ground. In other examples, camera 112, 306, 412 may be a camera mounted on another type of vehicle, such as a boat, ship, or other watercraft, or such as a car, truck, all-terrain-vehicle (ATV), or other land vehicle.

Method 700 also includes detecting or identifying in a step 704 features 302, 304 in camera image 300, and determining, such as by measuring, in a step 706 angles of view θ for feature pairs. The features are preferably scale and rotation invariant to facilitate limiting the searching to the relevant dimensions when matching features. A number of such feature detection methods have been developed, such as SIFT features mentioned above.

Figure 8:
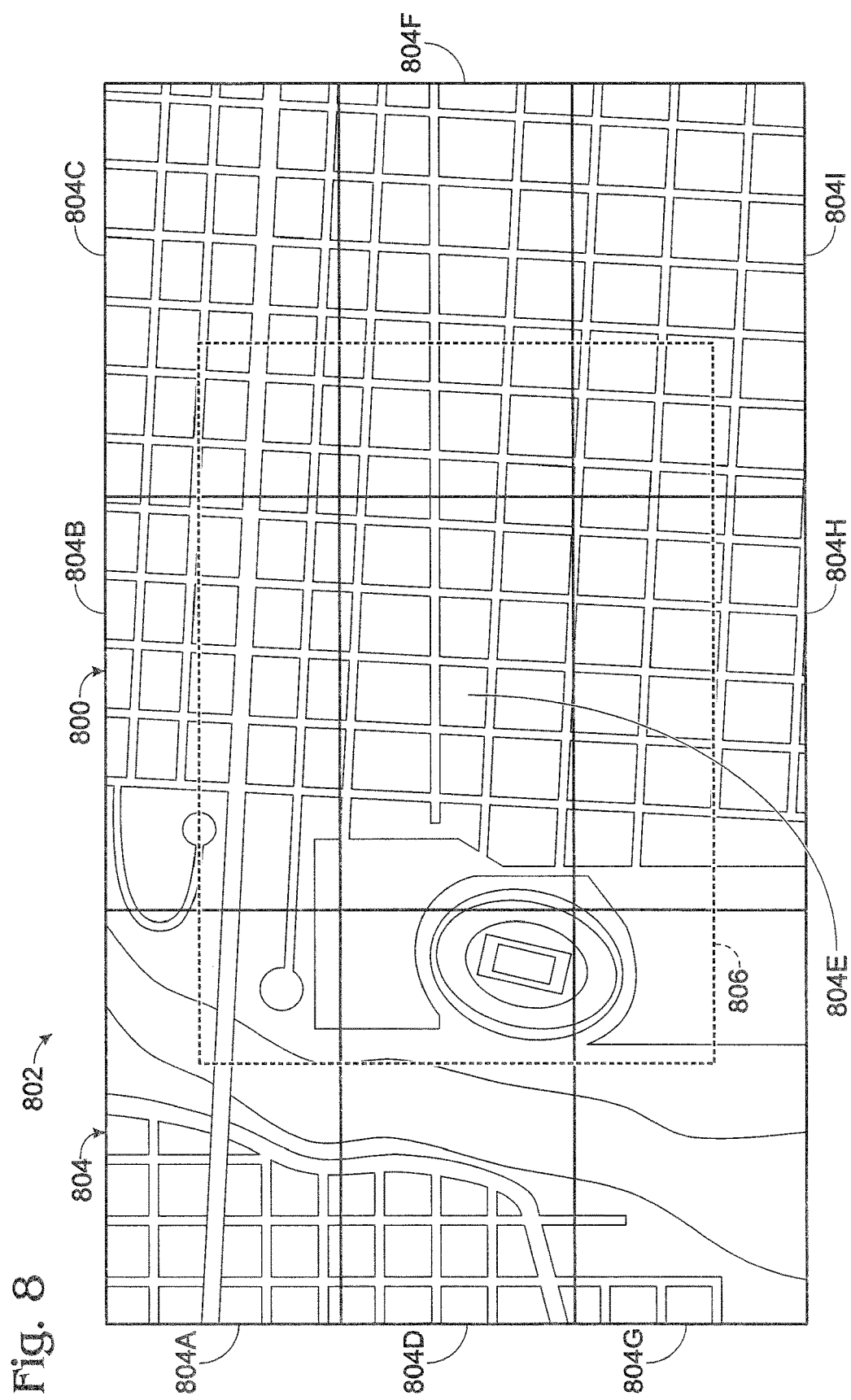
FIG. 8 is an illustration of a reference representation divided into sections.

A reference map 402 of the physical surface configuration, including the portion of the physical surface configuration imaged in camera image 300, is divided into divisions, also referred to as tiles. In some examples, the divisions correspond to an area that is less than a field of view of camera 306. An example of dividing a portion 800 of a reference map 802 is illustrated in FIG. 8. In this example, map portion 800 is divided into nine divisions or tiles 804. Tiles 804 include tiles 804A-804I, as shown.

The tiles 804 preferably cover mapped area 800 without overlaps or gaps. A list of features included in each tile are stored in association with the respective tiles 804A-804I. Each of a plurality of processor cores may be used to perform processes for a respective assigned tile. A map tile 804E, for example, is selected in a step 708 from a database storing reference map 802. An associated list of features existing in selected tile 804E as well as in an extended area 806 extending beyond the area of tile 804E is also selected from the database at a step 710. Extended area 806, having an outer boundary represented by a dashed line in FIG. 8, may correspond, for example to a field of view of camera 306, 412. Each extended area 806, preferably contains the features that are visible from a camera above area 804E. In this example, extended area 806 includes tile 804E as well as portions of tiles 804A-804D and 804F-804I. The area of tile 804E and overlap with other tile areas to form extended area 806 can be varied depending on the terrain and distribution of features in reference map 802.

The map feature pairs are then matched or otherwise associated, at a step 712 with feature pairs identified in camera image 300. Feature pairs are then selected for processing in a step 714. The respective processor core receives the measured feature-pair angles of view θ for the identified features. Feature pair-angle combinations that will likely not provide good localization are then filtered out. The filtering can be performed using the angle values and locations of the feature pairs in reference map 402 since the geoarc uncertainties depend on these values.

Figure 9:
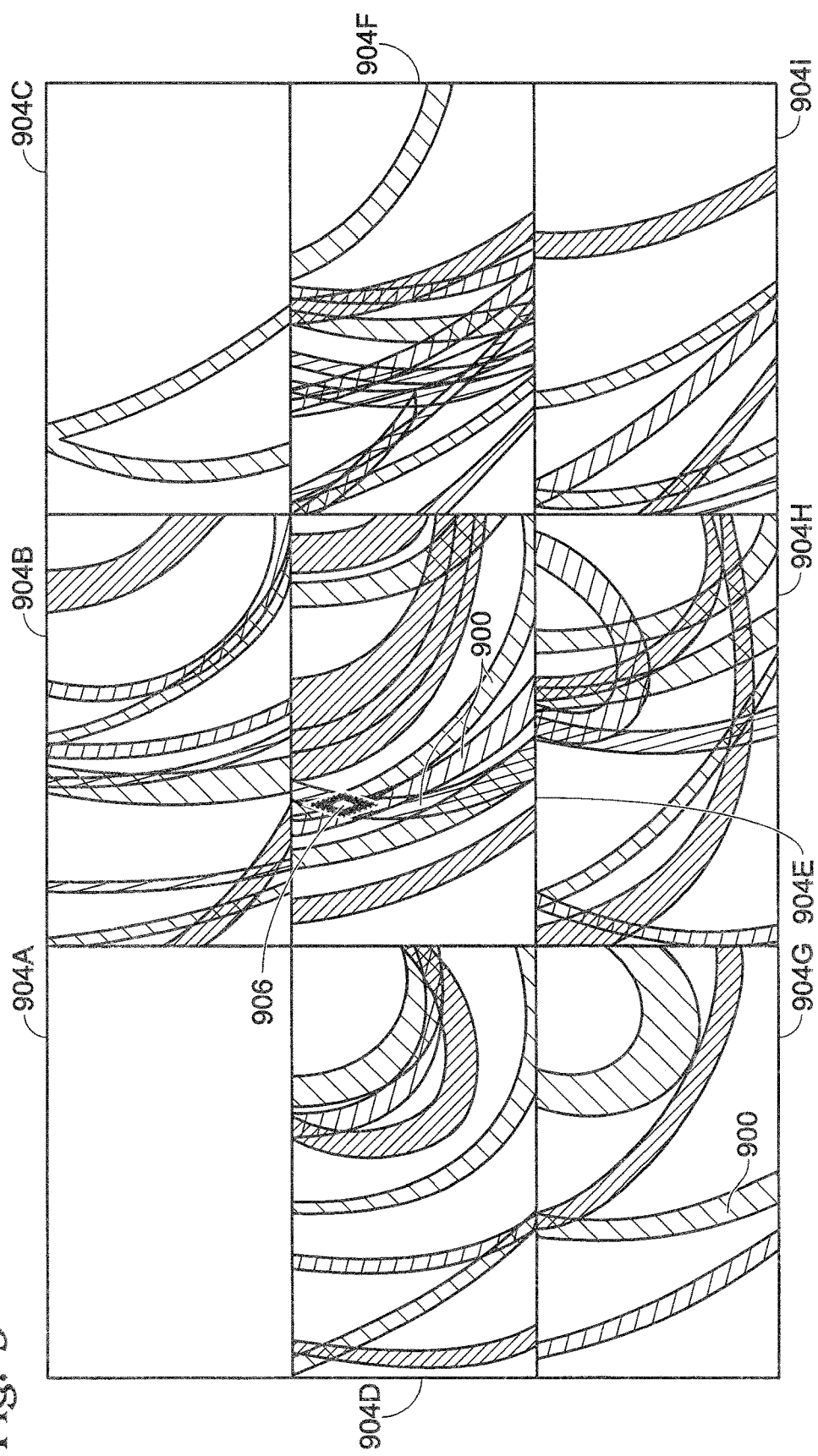
FIG. 9 is an illustration of portions of geoarcs for the sections shown in FIG. 8.

The surviving map feature pair locations and angles and the camera height are then used in a step 716 to compute geoarcs, such as geoarcs 416, 418, 420, in map tile 804E. The number of geoarcs that each pixel is in is then determined in a step 718, and then the pixel or pixels having the highest number of geoarcs is determined. The camera and vehicle location is given by the location of the maximum geoarc overlap. FIG. 9 illustrates an example of segments 900 of geoarcs generated for each of divisions 904A-904I corresponding to tiles 804A-804I in FIG. 8. The highest number of geoarc overlaps is at map location 906, which corresponds to the translated camera and vehicle location on reference map 802.

GALS processing time is reduced substantially using multiple processors in inverse proportion to the number of processors since the tiles can be processed simultaneously and independently. In a GALS processing flow demonstration, a frame from a CSUAV wide-area-imaging dataset taken over Ohio State University was used as a camera image. The camera image consisted of 668×1001 pixels covering a 690×460 meter area with a field of view of 23.9 degrees and was recorded from a height of 1630 m. Features were detected using the rotation and scale invariant SIFT algorithm and angles between feature pairs were measured using the camera parameters. A total of 116 SIFT features were detected. An image from Google Earth of the same area was used as the reference map. The reference map image was recorded at a different time of day with a different camera and a different orientation from the camera image. In addition, some of the buildings were different as well due to the images being taken at different times. SIFT features were then extracted from the reference map and matched with the camera features. The same SIFT algorithm and parameters were used for both the camera image and reference map features. 20 of the 116 camera features were assigned to map features, but only 12 were assigned correctly. Thus only about 10% of the feature assignments were valid.

The localization peak was in an area of 16×66 m and position error was 140 m assuming the camera was pointed straight down so the image center corresponded to the camera location. The localization signal peak value of 12 was significantly higher than other overlap values despite the low fraction of correct feature assignments. The maximum noise signal in the eight other tiles corresponding to incorrect locations was 3, which is a low false localization rate. The execution time was 3.9 seconds in Matlab on a desktop computer. The processing time for non-matching tiles was lower (1.9 seconds) because fewer features were matched which reduced the number of geoarcs. The execution times were dominated by the time required to draw the geoarcs on the computer screen, which would not be necessary in an actual GALS system. Matlab is also much slower than an embedded implementation. An embedded implementation is expected to be much faster.

Example 5

Figure 10:
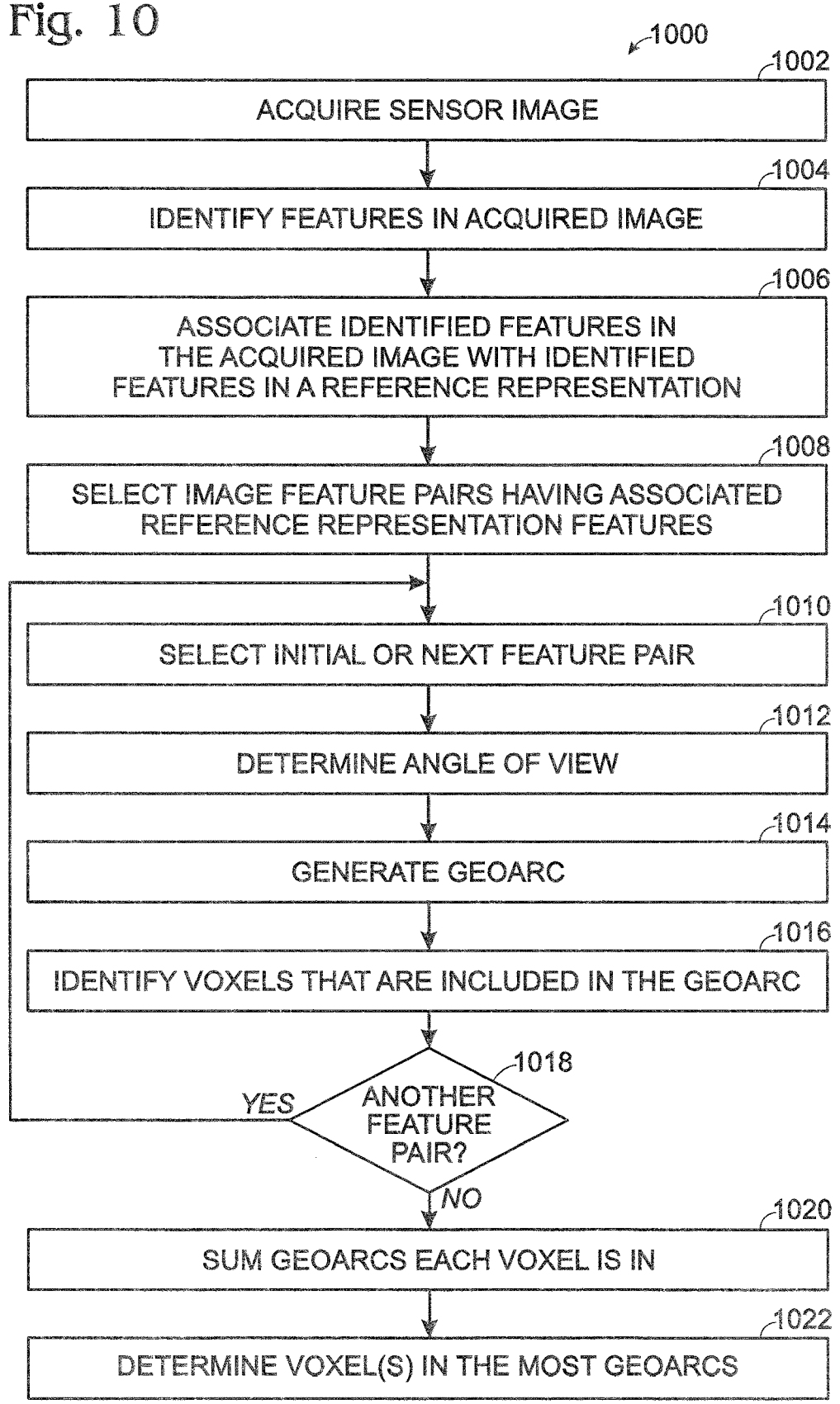
FIG. 10 is an illustration of operations performed by an embodiment for locating a vehicle having an image sensor.

This example is an illustrative spatial localization system and method using the reference representation defined in a three-dimensional space of volume elements (voxels); see FIGS. 1 and 10. FIG. 10 is a flowchart illustrating operations performed by one embodiment of a spatial localization system in an illustrative method, and may not recite the complete process or all steps of the method. Although various steps of a method 1000 are described below and depicted in FIG. 10, the steps need not necessarily all be performed, and in some cases may be performed in a different order than the order shown. This method and corresponding special localization system may be used when GPS or other localization systems are not available.

In this example, a method 1000 for 3D spatial localization, as with systems and methods described above, acquires in a step 1002 from a sensor 114, such as a camera 112, supported by a vehicle 116, a sensor image of a portion of a physical surface configuration 106 from a position spaced away from physical surface configuration 106. In a step 1004, features in the acquired image are identified. In a step 1006, identified features in the acquired image are associated with identified features in a three-dimensional reference representation of the portion of the physical surface configuration. The three-dimensional reference representation is defined in a three-dimensional space of volume elements (voxels). In FIG. 1, the 3D space is defined by Cartesian coordinates having a coordinate origin 118 at a location that may be unrelated to camera 112. A plurality of pairs of features in the acquired image are selected in a step 1008 that have corresponding identified pairs of features in the reference representation.

A series of steps are then performed for each selected feature pair in the acquired image. An initial or next feature pair is selected in a step 1010. An angle of view between the pair of features from the sensor is determined in a step 1012. In a step 1014, a three-dimensional geoarc associating the determined angle of view and the selected feature pair in the reference representation is generated. As discussed above, torus 100 is an example if a 3D geoarc. In a step 1016, voxels that are included in the generated geoarc are identified.

A determination is made in a step 1018 as to whether there is an additional feature pair for which steps 1010, 1012, 1014, and 1016 have not been performed. If there is, then the additional feature pair is selected and these steps are performed.

If there is no additional feature pair to process, then in a step 1020 the method includes summing for each identified voxel the number of generated geoarcs in which the voxel is included. In a step 1022, a determination is made as to which identified voxel or voxels are included in the highest number of geoarcs.

Example 6

This example is an illustrative spatial localization system and method using a reference representation defined in a three-dimensional space of volume elements (voxels) and a geoarc having a thickness representing uncertainties in the process; see FIGS. 1, 10, 11 and 12.

As described with reference to method 1000 in FIG. 10, as well as other figures discussed above, this example of spatial localization uses camera images to find a location of the camera 112, and thereby vehicle 116, using angles of view θ from the camera 112 between features 102,104 detected in a camera image and matched with features identified on a 3D reference representation of a physical surface configuration 106, as described with reference to steps 1002, 1004, 1006, and 1008 of method 1000. Such a method is particularly beneficial when external technology-based localization systems, such as GPS, are not available.

As has been stated, the angle of view θ is determined from the camera parameters, since the distance between two features in the sensor image has a direct relationship to the observed angle between them. Assigning a measured angle of view θ to a mapped feature pair restricts the possible (x, y, z) position of the camera in 3D coordinates to be on the surface of a self-intersecting or spindle torus as shown in FIG. 1. If feature pair angles of view are assigned to each of multiple map feature pairs, then the camera location is restricted to be on the intersection of multiple tori, which process is included in method 1000 described with reference to FIG. 10.

In this example, each geoarc generated in step 1014 has a nonzero surface thickness due to uncertainty in the measurement of the angle of view and map feature positions. A torus based on a specific angle of view is a surface with no thickness. A thickness may thus be defined by a range of angles of view that corresponds to the level of uncertainty. A geoarc with a thickness may thus be defined by the space between an inner torus generated using a maximum or high angle of view and an outer torus generated using a minimum or low angle of view. This is considered equivalent to a geoarc generated using an expected angle of view value and points within a range from the expected angle of view. The intersection of two geoarcs is thus a small 3D volume. If all the angles are correctly matched with map feature pairs, then three feature pairs formed from three features are sufficient to localize the camera. However, when the feature locations and angles are uncertain, the localization accuracy is improved using more feature pairs.

Finding the 3D intersections of multiple geoarcs defined as spindle tori is illustrated graphically similarly to the methods described above for 2D geoarcs, but using 3D geoarcs and determining overlap for each voxel instead of for pixels. However, the computational load can be decreased by dividing the 3D map space into voxels with variable resolution and using a population function to describe the spatial distribution of 3D geoarc overlapping regions in the 3D space.

For a 3D map with the features in arbitrary 3D positions, as is illustrated by features 102, 104 on the "poles" or axis of torus 100 in FIG. 1, 3D spindle torus 100 forms a 3D geoarc having a surface 122 representing possible positions in (x, y, z) space of a camera 112 having an angle of view θ of features 102, 104. 2D geoarcs can be generalized to 3D spindle tori as shown in FIG. 1.

Figure 11:
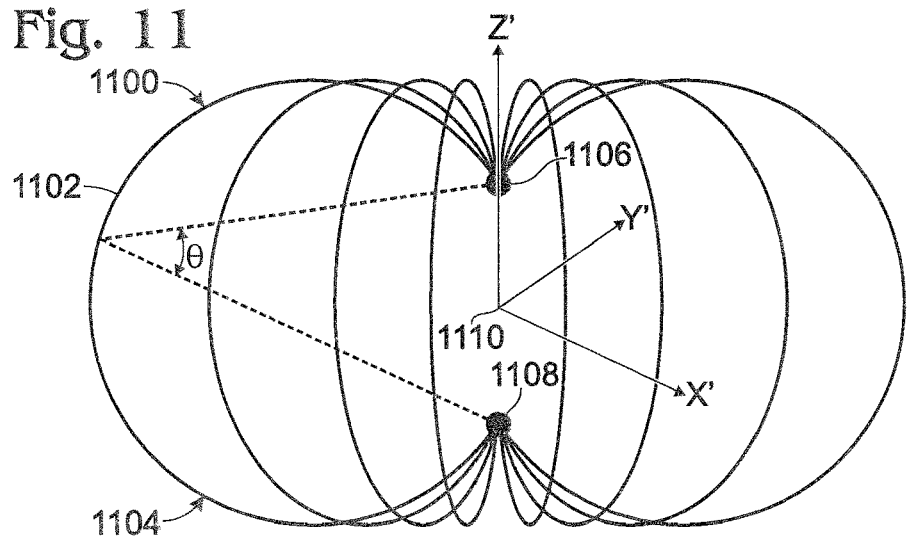
FIG. 11 is an illustration of an example of a three-dimensional geoarc and associated transformed coordinate origin.

FIG. 11 illustrates a 3D torus 1100 having a surface 1102 that represents a geoarc 1104 for two features 1106, 1108 identified on a reference representation of at least a portion of a physical surface configuration. Torus 1100 is defined in torus-centered (x', y', z') coordinates having a coordinate origin 1110 centered on the z' axis between the positions of features 1106, 1108. Torus 1100 and geoarc 1104 then represent possible locations relative to features 1106, 1108 for a camera angle of view θ.

A plurality of 3D geoarcs for a given camera location, as has been described, may be treated as 3D graphic objects and added together. A localization signal $S_{loc}$ (located at the peak value of the summed geoarcs) will have a value of $$S_{loc} = N_c = m_v(m_v-1)/2,$$

where $m_v$ is the number of features detected in the camera image that are valid, e.g. are features that are in the 3D map and are members of feature pairs with correctly assigned measured feature pair angles. The probability of $N_c$ 3D geoarcs accidentally overlapping at a random location is the product of the fractional 3D geoarc volumes:

$$P_c = \prod_{n=1}^{N_c} \frac{V_n}{L^3},$$

where $L^3$ an L×L×L reference map volume and $V_n$ is the volume of 3D-geoarc n. $P_c$ decreases rapidly with $N_c$ while the localization signal increases linearly with $N_c$ and quadratically with the number of valid features. The 3D geoarc system and method thus produce reliable results when there are substantial errors in feature detection, matching, and angle assignment. Thus, it is acceptable if a small fraction of the 3D geoarcs are valid, since the localization signal $S_{loc}$ exceeds the noise signal $S_{noise}$ due to such errors.

Figure 12:
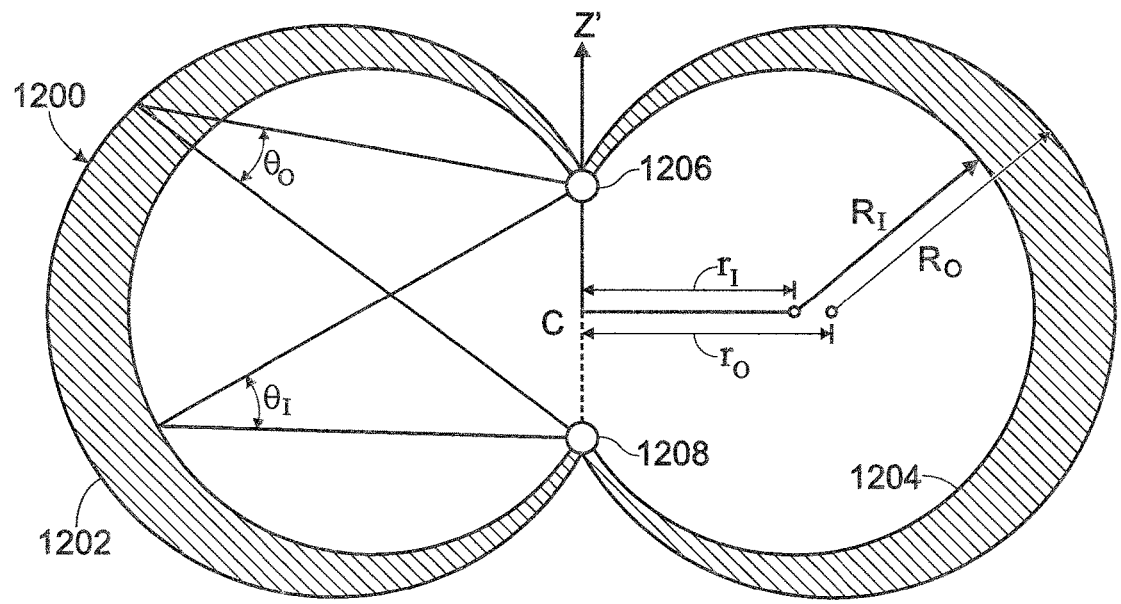
FIG. 12 is an illustration of a two-dimensional slice of a geoarc illustrating geoarc features.

One approach to finding the location signal peak is to add the 3D geoarc figures graphically and then search the 3D map for the maximum overlap, as was described above for 2D geoarc localization. In this approach the 3D space is divided into voxels. Then, instead of adding 3D geoarcs, each voxel is tested to determine if its center point is inside or outside a 3D geoarc, as shown in FIG. 12 using a cross-section of a 3D geoarc 1200 having a thickness to represent uncertainty.

The volume of possible camera locations for a given angle-of-view θ/feature-pair is given by the difference between the volumes of two spindle tori 1202, 1204 that are defined by the maximum and minimum possible values of the measured angle of view θ of features 1206, 1208. The possible location of the camera is restricted to the region in FIG. 12 which consists of 3D points that are both inside the outer torus 1202 and outside the inner torus 1204. This is referred to herein as the "inside-outside test".

Outer torus 1202 represents an angle of view $θ_o=θ-\Delta θ$ and has a cross-section radius $R_o$. Inner torus 1204 represents an angle of view $θ_I=θ+\Delta θ$, has a cross-section radius $R_I$, and the center of curvature is a distance $r_I$ from the z' axis passing through the relative locations of features 1206, 1208. Angle of view $θ_o$ is less than angle of view $θ_I$. Given a distance c between features 1206, 1208 from the reference map and the observed angle θ along with its measurement uncertainty $\Delta θ$, the simple inside-outside test represented by FIG. 12 is performed to determine if a voxel is covered by the 3D geoarc. If it is, the value of a population function for the voxel location is incremented by 1.

The interior point test for a given coordinate (x', y', z') to be inside the outer torus 1202 is:

$$(r_o - \sqrt{x'^2 + y'^2})^2 + z'^2 \leq R_o,$$

and the interior point test for the given coordinate to be outside the inner torus 1204 is:

$$R_I \leq (r_I - \sqrt{x'^2 + y'^2})^2 + z'^2,$$

where $$R = \frac{c}{2\sin θ},$$

and $$r = \frac{c}{2}\left(\frac{1}{\sin θ} - \tan(θ/2)\right).$$

After looping over all 3D geoarcs and voxels, the 3D location of the camera is given by the maximum of the population functions of the voxels.

The inside-outside test in FIG. 12 assumes the line separating the features is aligned with the z axis and centered on the coordinate origin. In order to handle features at arbitrary locations (x, y, z) in 3D space defined by a coordinate origin unrelated to the torus, a coordinate transform is applied to the coordinates of the features to translate and orient each 3D geoarc to the standard position and pose for the inside-outside test as illustrated in FIGS. 11 and 12. In other words, the coordinates (x, y, z) of torus 100 of FIG. 1 based on remote coordinate origin 118 are transformed to coordinates (x', y', z') of torus 1100 based on a coordinate origin 1110.

This can be done by first translating the (x, y, z) coordinate system by $T=-[x_c, y_c, z_c]$, where $(x_c, y_c, z_c)$ is the center point on a line between the locations of the features, as shown for torus 100 in FIG. 1. The torus is then rotated by α about the z axis and by β about the y axis, where $$α = \cos^{-1}\left(\frac{y_C}{\sqrt{x_C^2 + y_C^2}}\right) \text{ and } β = \cos^{-1}\left(\frac{z_C}{\sqrt{x_C^2 + y_C^2 + z_C^2}}\right).$$

The rotation matrices are $$\mathfrak{R}_\alpha = \begin{bmatrix} \cos\alpha & -\sin\alpha & 0 \\ \sin\alpha & \cos\alpha & 0 \\ 0 & 0 & 1 \end{bmatrix} \text{ and } \mathfrak{R}_\beta = \begin{bmatrix} \cos\beta & 0 & \sin\beta \\ 0 & 1 & 0 \\ -\sin\beta & 0 & \cos\beta \end{bmatrix}.$$

We can then apply the inside-outside test is then applied for points in the resulting (x', y', z') coordinate system.

In some embodiments, the population function computations are reduced using spatial voxel sampling that is adapted to the scene containing the physical surface configuration using foveation or spatially-variable 3D resolution. For example, a larger angle uncertainty and coarser sample spacing may be applied initially. This can be achieved, for example, by using a larger voxel size. The angle uncertainty and sample spacing can then be reduced in a second iteration to fine-tune the initial computations. This iteration may be limited to regions or other portions of interest having higher population function values. The voxel size may thus be based at least in part on the sums for each voxel of the number of generated geoarcs in which the voxel is included.

In addition, the processing can be partitioned spatially and efficiently distributed over multiple parallel processors for concurrent computing of different regions. For example, the 3D reference map may be divided into 3D divisions. Thus, instead of 2D (x, y) tiles 804 as discussed for the 2D reference map 802 illustrated in FIG. 8, the tiles are expanded into 3D (x, y, z) regions of space also having a non-zero dimension in the z direction. The process is then repeated by concurrently for each of a plurality of the plurality of separate portions, by identifying whether the voxels in each respective separate portion are included in the generated geoarc.

Example 7

This example is an illustrative example of operations for generating a feature reference map as an example of a reference representation of a physical surface configuration; see FIG. 13. FIG. 13 is a flowchart illustrating operations performed by one embodiment of a spatial localization system in an illustrative method, and may not recite the complete process or all steps of the method. Although various steps of a method 1300 are described below and depicted in FIG. 13, the steps need not necessarily all be performed, and in some cases may be performed in a different order than the order shown.

In this example, a method 1300 of generating a reference representation includes a step 1302 of obtaining a 3D model of a scene including the physical surface configuration. For each of multiple viewpoints of the model from positions spaced from the model, in a step 1304, an initial or next model viewpoint is selected. An image of the 3D model is recorded in a step 1306, and in a step 1308, features in the 2D image are detected. In a step 1310, the features detected in the 2D image are matched to features in the 3D model of the scene and then backprojected to the matched features in the 3D model to determine the 3D locations of the matched features. A determination is made at a step 1312 as to whether there is an additional selected viewpoint. If so, processing returns to step 1304. Otherwise, in a step 1314 the 3D model, features, and locations are stored for use in spatially locating a vehicle relative to the physical surface configuration.

Example 8

This example is an illustrative method for spatially localizing a vehicle relative to a physical surface configuration located in 3D coordinate space; see FIG. 14. FIG. 14 is a flowchart illustrating operations performed by one embodiment of a spatial localization system in an illustrative method, and may not recite the complete process or all steps of the method. Although various steps of method 1400 are described below and depicted in FIG. 14, the steps need not necessarily all be performed, and in some cases may be performed in a different order than the order shown.

In this example, a method 1400 of spatial localizing includes a step 1402 of partitioning the 3D map space of the 3D model generated in method 1300 into zero-valued voxels with optional foveation and/or subsampling. Examples of subsampling, may include dividing the 3D map space into divisions or regions for concurrent parallel processing, and/or incremental modification of voxel size based on geoarc overlaps at voxel locations. In a step 1404, an image by a sensor, such as a camera, is recorded or otherwise acquired. Features in the acquired image are identified in a step 1406, and features identified in the acquired image are matched in a step 1408 with the 2D images of the 3D reference map features obtained in method 1300. The features preferably are rotation and scale invariant features such as SIFT or SURF features, Angular separations (angles of view θ) of pairs of matched feature pairs are measured in a step 1410.

For each 3D map feature pair, the associated measured angle of view θ, and the associated angle measurement uncertainty, and for a given voxel size, the following steps are performed. An initial or next feature pair is selected in a step 1412. A geoarc 100 is generated based on the selected feature pair and associated angle of view in a step 1414. Camera location uncertainty may be represented as a non-zero thickness of the 3D geoarc. Coordinates of selected voxels are transformed in a step 1416 into a coordinate system aligned with the 3D geoarc for the feature pair and measured angle of view θ, such as is described for geoarcs 1100, 1200.

An inside-outside test, as described for geoarc 1200, is performed for all selected voxels in a step 1418 to determine whether the center point of each voxel is inside the minimum-angle torus, such as outer torus 1204, and outside the maximum angle torus, such as inner torus 1202. If so, the voxel value is incremented by one.

A determination is made in a step 1420 as to whether there is another feature pair to process. If so, processing returns to step 1412. If not, a determination is made in a step 1422 as to whether the processing is to be repeated for selected voxels using a modified voxel size. For example, once the population function for voxels identifies voxels having a high geoarc count, the voxel size may be reduced in a limited 3D space to make a redetermination using smaller voxel areas for the space occupied by the larger voxels. A similar process may be performed for angle of view uncertainty level. If a more detailed process is selected, then a different voxel size, such as a smaller voxel size, is selected in a step 1424 and processing return to step 1412 for selection of an initial feature pair.

If the voxel size is determined in step 1422 not to be modified, then the camera location is determined in a step 1426 by finding the highest value voxels in the 3D reference map. Optionally, the camera pose may also be determined in a step 1428 from the locations in the camera image of features belonging to the feature pairs that contributed to the maximum camera location signal. Thus, localization information is determined for the camera and a vehicle supporting the camera without reliance on external technologies, as is the case with GPS.

Example 9

Figure 15:
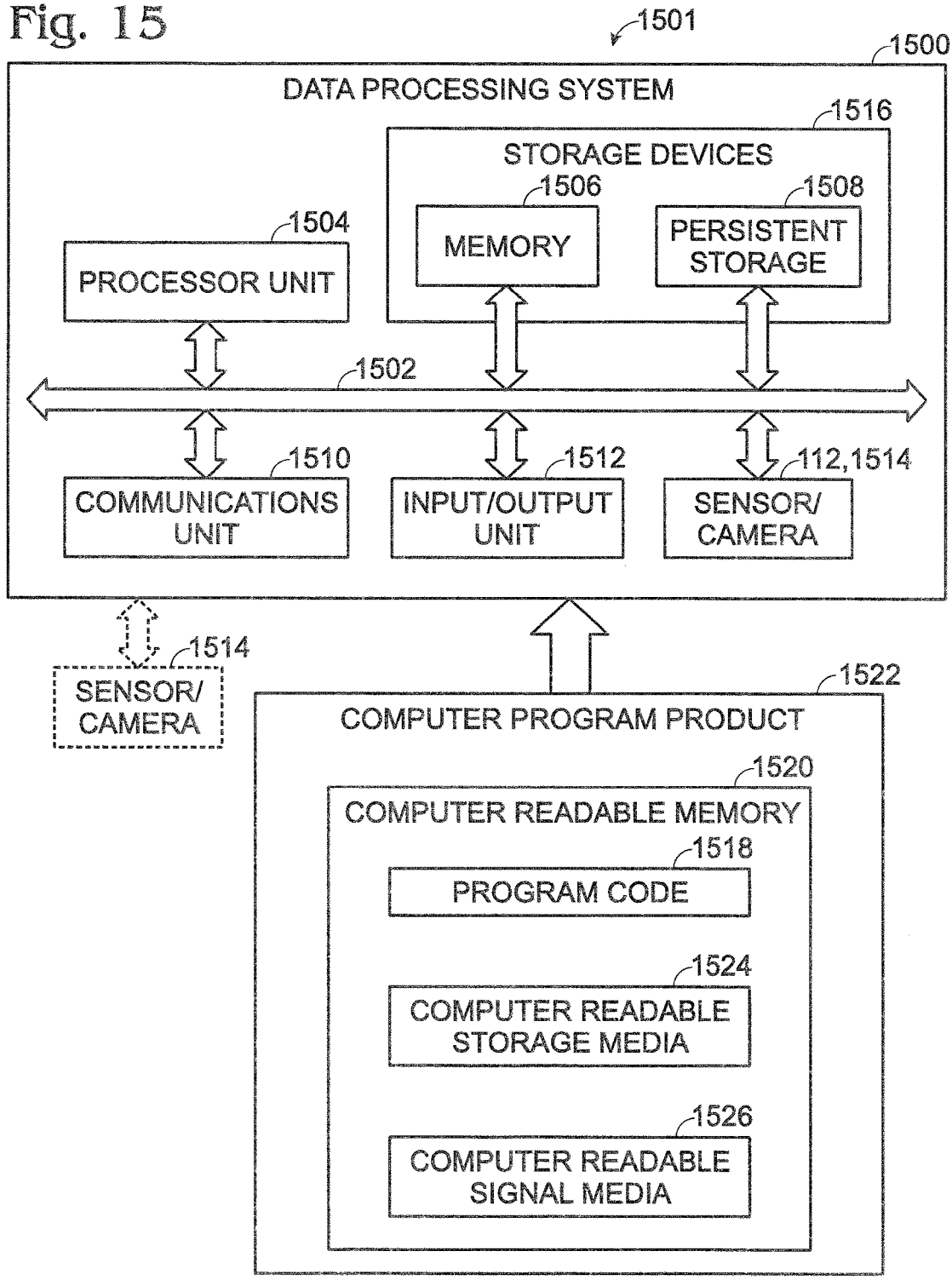
FIG. 15 is a schematic diagram of various components of an illustrative data processing system.

As shown in FIG. 15, this example is a data processing system 1500 in accordance with aspects of the present disclosure. In this example, data processing system 1500 is an illustrative data processing system suitable for implementing aspects of a spatial localization system 1501 and associated methods. More specifically, in some examples, devices that are embodiments of data processing systems (e.g., smartphones, tablets, personal computers) may perform some or all of the methods described above. For example, a vehicle may have a resident data processing system for determining the location of the vehicle using images acquired by a resident camera 112.

In this illustrative example, data processing system 1500 includes communications framework 1502. Communications framework 1502 provides communications between processor unit 1504, memory 1506, persistent storage 1508, communications unit 1510, input/output (I/O) unit 1512, and display 1514. Memory 1506, persistent storage 1508, communications unit 1510, input/output (I/O) unit 1512, and sensor 1514, such as camera 112, are examples of resources accessible by processor unit 1504 via communications framework 1502. Spatial localization system 1501 may include sensor 1514.

Processor unit 1504 serves to run instructions that may be loaded into memory 1506. Processor unit 1504 may be a number of processors, a multi-processor core, or some other type of processor, depending on the particular implementation. Further, processor unit 1504 may be implemented using a number of heterogeneous processor systems in which a main processor is present with secondary processors on a single chip. As another illustrative example, processor unit 1504 may be a symmetric multi-processor system containing multiple processors of the same type.

Memory 1506 and persistent storage 1508 are examples of storage devices 1516. A storage device is any piece of hardware that is capable of storing information, such as, for example, without limitation, data, program code in functional form, and other suitable information either on a temporary basis or a permanent basis.

Storage devices 1516 also may be referred to as computer-readable storage devices in these examples. Memory 1506, in these examples, may be, for example, a random access memory or any other suitable volatile or non-volatile storage device. Persistent storage 1508 may take various forms, depending on the particular implementation.

For example, persistent storage 1508 may contain one or more components or devices. For example, persistent storage 1508 may be a hard drive, a flash memory, a rewritable optical disk, a rewritable magnetic tape, or some combination of the above. The media used by persistent storage 1508 also may be removable. For example, a removable hard drive may be used for persistent storage 1508.

Communications unit 1510, in these examples, provides for communications with other data processing systems or devices. In these examples, communications unit 1510 is a network interface card. Communications unit 1510 may provide communications through the use of either or both physical and wireless communications links.

Input/output (I/O) unit 1512 allows for input and output of data with other devices that may be connected to data processing system 1500. For example, input/output (I/O) unit 1512 may provide a connection for user input through a keyboard, a mouse, and/or some other suitable input device. Further, input/output (I/O) unit 1512 may send output to a printer. A display provides a mechanism to display information to a user and if it is a touch screen, serves as an input device.

A reference representation 400, such as a reference map 402, and related features, locations, and related data may be stored in a reference database as part of persistent storage 1508. Alternatively, a reference database may be stored on a storage device that is located remotely relative to the data processor that may execute program code 1518. Processor unit 1504 may also be in communication with a camera or sensor 1514, where the sensor may be capable of capturing one or more target images (for example, a scenes within the sensor's field of view to be used by one or more of the methods described herein. Sensor 1514 may be coupled directly to communications framework 1502 in data processing system 1500 or it may be connected remotely via communications unit 1510, as shown in dashed lines. Sensor 1514 may, for example, be resident on a vehicle, and data processing system 1500 resident on an earth-based, remote, or other station, in which case sensor images are transmitted to the remote data processing system.

Instructions for the operating system, applications, and/or programs may be located in storage devices 1516, which are in communication with processor unit 1504 through communications framework 1502. In these illustrative examples, the instructions are in a functional form on persistent storage 1508. These instructions may be loaded into memory 1506 for execution by processor unit 1504. The processes of the different embodiments may be performed by processor unit 1504 using computer-implemented instructions, which may be located in a memory, such as memory 1506.

These instructions are referred to as program instructions, program code, computer usable program code, or computer-readable program code that may be read and executed by a processor in processor unit 1504. The program code in the different embodiments may be embodied on different physical or computer-readable storage media, such as memory 1506 or persistent storage 1508.

Program code 1518 is located in a functional form on computer-readable media 1520 that is selectively removable and may be loaded onto or transferred to data processing system 1500 for execution by processor unit 1504. Program code 1518 and computer-readable media 1520 form computer program product 1522 in these examples. In one example, computer-readable media 1520 may be computer-readable storage media 1524 or computer-readable signal media 1526.

Computer-readable storage media 1524 may include, for example, an optical or magnetic disk that is inserted or placed into a drive or other device that is part of persistent storage 1508 for transfer onto a storage device, such as a hard drive, that is part of persistent storage 1508. Computer-readable storage media 1524 also may take the form of a persistent storage, such as a hard drive, a thumb drive, or a flash memory, that is connected to data processing system 1500. In some instances, computer-readable storage media 1524 may not be removable from data processing system 1500.

In these examples, computer-readable storage media 1524 is a physical or tangible storage device used to store program code 1518 rather than a medium that propagates or transmits program code 1518. Computer-readable storage media 1524 is also referred to as a computer-readable tangible storage device or a computer-readable physical storage device. In other words, computer-readable storage media 1524 is non-transitory.

Alternatively, program code 1518 may be transferred to data processing system 1500 using computer-readable signal media 1526. Computer-readable signal media 1526 may be, for example, a propagated data signal containing program code 1518. For example, computer-readable signal media 1526 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 1518 may be downloaded over a network to persistent storage 1508 from another device or data processing system through computer-readable signal media 1526 for use within data processing system 1500. For instance, program code stored in a computer-readable storage medium in a server data processing system may be downloaded over a network from the server to data processing system 1500. The data processing system providing program code 1518 may be a server computer, a client computer, or some other device capable of storing and transmitting program code 1518.

The different components illustrated for data processing system 1500 are not meant to provide architectural limitations to the manner in which different embodiments may be implemented. The different illustrative embodiments may be implemented in a data processing system including components in addition to and/or in place of those illustrated for data processing system 1500. Other components shown in FIG. 15 can be varied from the illustrative examples shown. The different embodiments may be implemented using any hardware device or system capable of running program code. As one example, data processing system 1500 may include organic components integrated with inorganic components and/or may be comprised entirely of organic components excluding a human being. For example, a storage device may be comprised of an organic semiconductor.

In another illustrative example, processor unit 1504 may take the form of a hardware unit that has circuits that are manufactured or configured for a particular use. This type of hardware may perform operations without needing program code to be loaded into a memory from a storage device to be configured to perform the operations.

For example, when processor unit 1504 takes the form of a hardware unit, processor unit 1504 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 1518 may be omitted, because the processes for the different embodiments are implemented in a hardware unit.

In still another illustrative example, processor unit 1504 may be implemented using a combination of processors found in computers and hardware units. Processor unit 1504 may have a number of hardware units and a number of processors that are configured to run program code 1518. With this depicted example, some of the processes may be implemented in the number of hardware units, while other processes may be implemented in the number of processors.

In another example, a bus system may be used to implement communications framework 1502 and may be comprised of one or more buses, such as a system bus or an input/output bus. Of course, the bus system may be implemented using any suitable type of architecture that provides for a transfer of data between different components or devices attached to the bus system.

Additionally, communications unit 1510 may include a number of devices that transmit data, receive data, or both transmit and receive data. Communications unit 1510 may be, for example, a modem or a network adapter, two network adapters, or some combination thereof. Further, a memory may be, for example, memory 1506, or a cache, such as that found in an interface and memory controller hub that may be present in communications framework 1502.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Example 10

Figure 16:
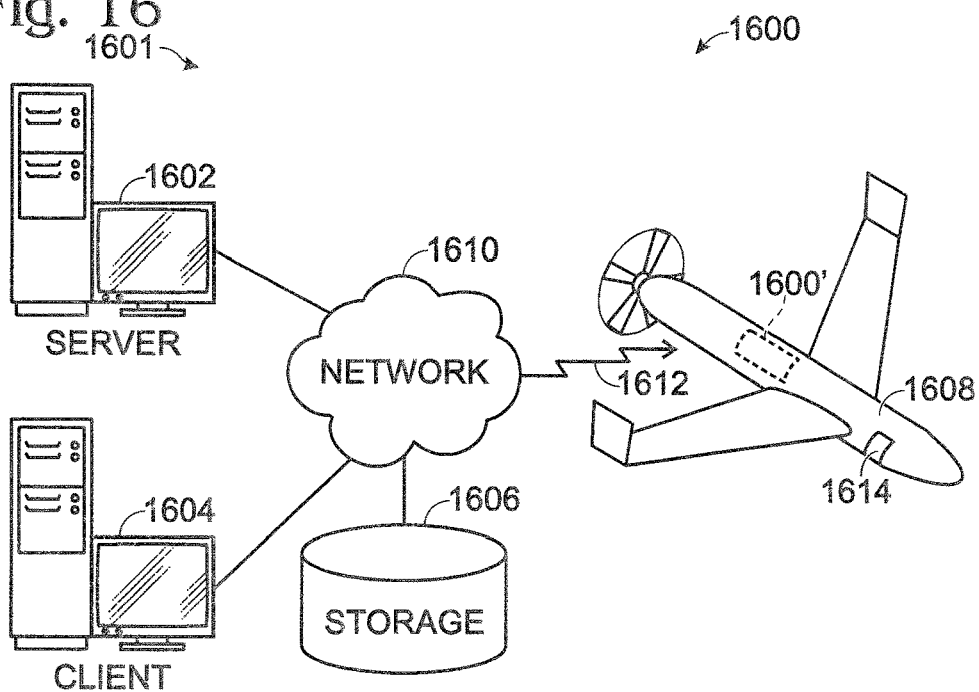
FIG. 16 is a schematic representation of an illustrative computer network system.

As shown in FIG. 16, this example is a general network data processing system 1600, interchangeably termed a network, a computer network, a network system, or a distributed network, aspects of which may be included in one or more illustrative embodiments of a spatial localization system 1601. For example, as stated above, program code stored in a computer-readable storage medium in a server data processing system may be downloaded over a network from the server to data processing system 1600. Alternatively, a data processing system 1600' may be resident on a vehicle with an image sensor. It should be appreciated that FIG. 16 is provided as an illustration of one implementation and is not intended to imply any limitation with regard to environments in which different embodiments may be implemented. Many modifications to the depicted environment may be made.

Network data processing system 1600 is a network of computers, each of which is an example of data processing system 1500, and other components. Network data processing system 1600 may include a server 1602, a client device 1604, a storage device 1606, a vehicle 1608, such as a UAV or other type of aircraft, or a land, water, or space vehicle, and a network 1610. Vehicle 1608 may be an example of a client device 1606 or it may be a stand-alone system with a resident data processing system 1600'. Vehicle 1608 also includes a camera 1614 or other imaging device that may be connected to network 1610 or resident data processing system 1600' as discussed with reference to FIG. 15. Network 1610 is a medium configured to provide communications links between various devices and computers connected together within network data processing system 1600. Network 1610 may include connections such as wired or wireless communication links, such as a wireless link 1612 between network 1610 and vehicle 1608, fiber optic cables, and/or any other suitable medium for transmitting and/or communicating data between network devices, or any combination thereof.

In the depicted example, server 1602, client 1604, and vehicle 1608 connect to network 1610, as does electronic storage device 1606. Network devices 1602, 1604, and 1608 are each examples of data processing system 1500, described above. In the depicted example, device 1602 is shown as a server computer. However, network devices may include, without limitation, one or more personal computers, mobile computing devices such as personal digital assistants (PDAs), tablets, and smart phones, handheld gaming devices, wearable devices, tablet computers, routers, switches, voice gates, servers, electronic storage devices, imaging devices, and/or other networked-enabled tools that may perform a mechanical or other function. These network devices may be interconnected through wired, wireless, optical, and other appropriate communication links.

In addition, client electronic devices, such as a client computer 1604 and vehicle 1608 may connect to network 1610. Each of these devices is an example of data processing system 1500, described above regarding FIG. 15. In some examples, communications-enabled data processing systems on one or more vehicles 1608 may connect to network 1610. Client electronic devices 1604 may include, for example, one or more personal computers, network computers, and/or mobile computing devices such as personal digital assistants (PDAs), smart phones, handheld gaming devices, wearable devices, and/or tablet computers, and the like. In the depicted example, server 1602 provides information, such as boot files, operating system images, and applications to one or more of client electronic devices 1604 and 1608. Client electronic devices 1604, 1608 may be referred to as "clients" with respect to a server such as server computer 1602. Network data processing system 1600 may include more or fewer servers and clients or no servers or clients, as well as other devices not shown.

Program code located in system 1600 may be stored in or on a computer recordable storage medium, such as persistent storage 1508 in Example 8, and may be downloaded to a data processing system or other device for use. For example, program code may be stored on a computer recordable storage medium on server computer 1602 and downloaded for use to client 1604, 1608 over network 1610.

Network data processing system 1600 may be implemented as one or more of a number of different types of networks. For example, system 1600 may include an intranet, a local area network (LAN), a wide area network (WAN), or a personal area network (PAN). In some examples, network data processing system 1600 includes the Internet, with network 1610 representing a worldwide collection of networks and gateways that use the transmission control protocol/Internet protocol (TCP/IP) suite of protocols to communicate with one another. At the heart of the Internet is a backbone of high-speed data communication lines between major nodes or host computers. Thousands of commercial, governmental, educational and other computer systems may be utilized to route data and messages. FIG. 16 is intended as an example, and not as an architectural limitation for any illustrative embodiments.

Example 11

Figure 17:
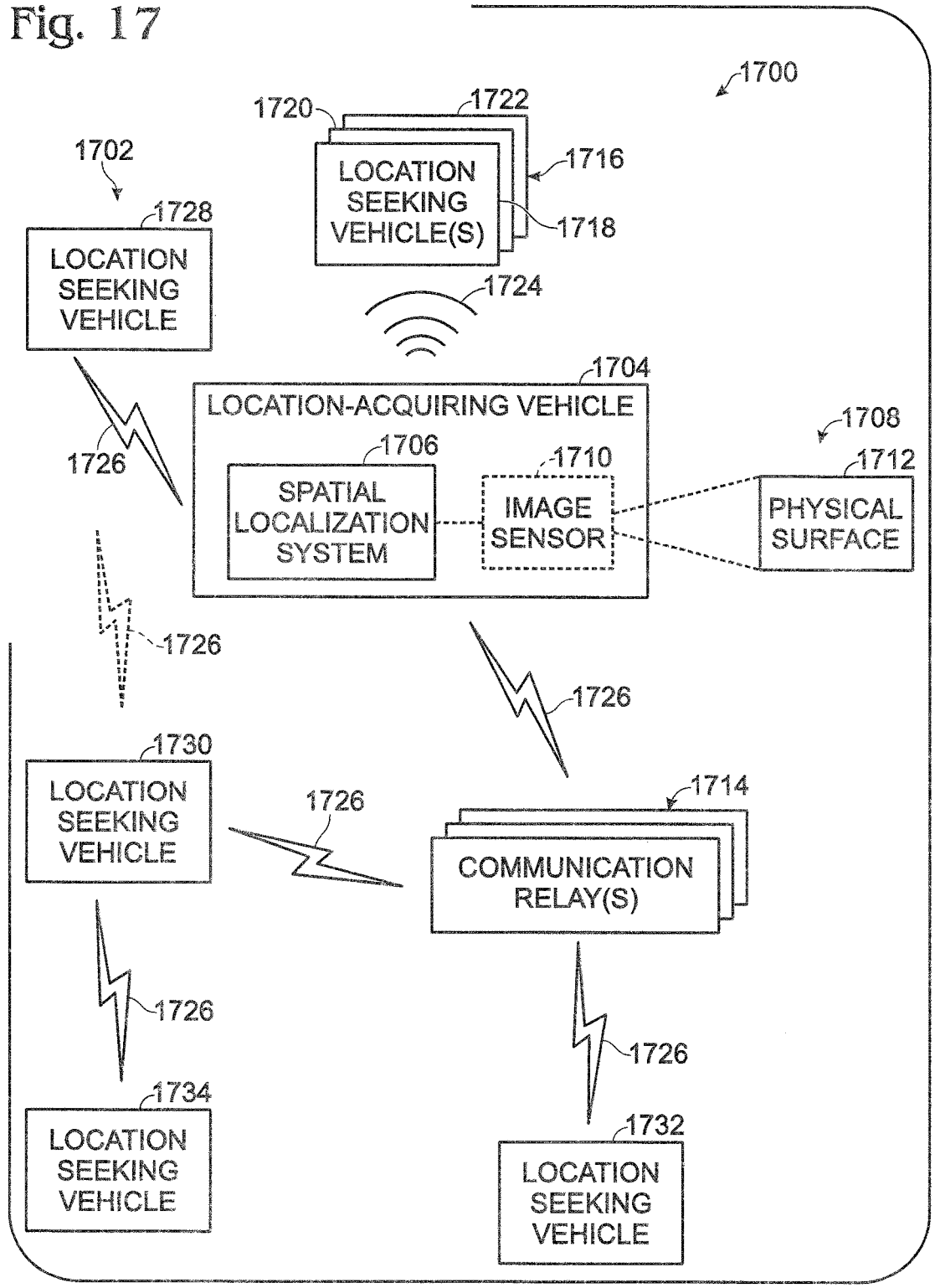
FIG. 17 is a block diagram illustrating an embodiment for locating vehicles relative to a location-acquiring vehicle.

FIG. 17 is a block diagram illustrating an embodiment of a vehicle-group localization system 1700 for locating one or more location-seeking vehicles 1702 relative to a location-acquiring vehicle 1704. Location-acquiring vehicle 1704 includes a spatial localization system 1706. Spatial localization system 1706 may be an example of spatial localization system 1501, 1601 using a methodology described above, in which case it is configured to receive an image of a physical-surface configuration 1708 from an image sensor 1710. Physical-surface configuration may, for example, be a physical surface 1712, also as described above. Optionally, other technologies may be used for localizing vehicle 1704, such as GPS.

FIG. 17 illustrates various scenarios in which location information acquired by vehicle 1704 may be shared with one or more location-seeking vehicles 1702. Each of location-seeking vehicles 1702 has a presumed known or knowable relative spatial relationship to location-acquiring vehicle 1704, such as being part of a defined relative formation, a visual determination by a human occupant of a vehicle, or by technological means, such as radar or lidar. Also, the respective vehicles are presumed to have capabilities for communicating directly with location-acquiring vehicle 1704 or indirectly through a communication path including another location-seeking vehicle 1702 or including one or more communication relays 1714 in any combination.

For example, a group 1716 of location-seeking vehicles 1702, such as vehicles 1718, 1720, 1722, may determine their location based on a location acquired by location-acquiring vehicle 1704. Such a group 1716 may have an association, such as traveling in a maintained formation or be traveling in sufficiently close proximity to location-acquiring vehicle 1704 to consider the location of location-seeking vehicles 1702 in group 1716 to be effectively the same as that of location-acquiring vehicle 1704. Communication from location-acquiring vehicle 1704 to location seeking vehicles 1718, 1720, 1722 may be by direct broadcast or otherwise sent to two or more location-seeking vehicles 1702 at the same time, as represented by general signal 1724, or may be by direct transmission, as represented by a single signal 1726, to individual vehicles.

Location-acquiring vehicle 1704 may also communicate directly with a single location-seeking vehicle 1728 using a single direct-transmission signal 1726. Location-seeking vehicle 1728 may not relay the location to any other vehicles or it may communicate the location information to another location-seeking vehicle 1730 directly or through an intermediary facility, such as a communication relay 1714.

Location-acquiring vehicle 1704 may also communicate initially with a communication relay 1714, which may in turn communicate with another communication relay 1714 or with one or more location-seeking vehicles 1702, such as location-seeking vehicles 1730 and 1732. A location-seeking vehicle 1702 may use received location information and may or may not communicate the location information to another location-seeking vehicle, such as a location-seeking vehicle 1734.

It will be appreciated, that the examples illustrated in FIG. 17 are only a few of the many different communication paths that may be possible in communicating location information from location-acquiring vehicle 1704 to one or more location-seeking vehicles 1702. Location-seeking vehicles 1702 thereby receive indirectly the localization information obtained by location-acquiring vehicle 1704 through operation of its spatial localization system 1706.

Example 12

Figure 18:
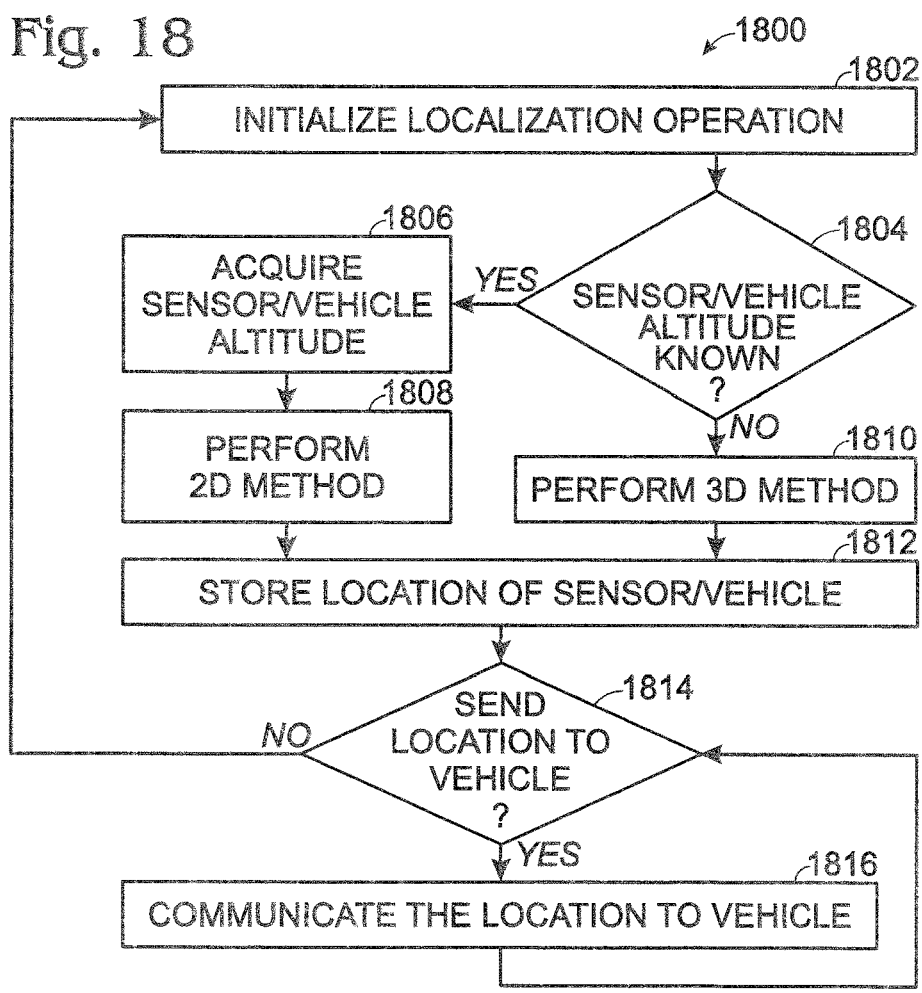
FIG. 18 is an illustration of operations performed by an embodiment for locating a vehicle having an image sensor.

This example is an illustrative method for spatially localizing a vehicle relative to a physical surface configuration;

see FIG. 18. FIG. 18 is a flowchart illustrating operations performed by one embodiment of a spatial localization system in an illustrative method, and may not recite the complete process or all steps of the method. Although various steps of a method 1800 are described below and depicted in FIG. 18, the steps need not necessarily all be performed, and in some cases may be performed in a different order than the order shown.

In this example, method 1800 of spatial localizing includes a step 1802 of initializing a localization operation. At a step 1804, a determination is made as to whether the altitude, or more generally the distance, of a vehicle, such as a location-acquiring vehicle 1704 and a supported image sensor 1710, from a physical-surface configuration 1708, is known. If it is known, the sensor/vehicle altitude is acquired in a step 1806. A two-dimensional spatial localization operation is then performed in a step 1808. Examples of such a spatial localization operation include methods 600 and 700 described above. If the altitude is not known or available, then a three-dimensional spatial localization operation is performed in a step 1810. Examples of such a spatial localization operation include methods 1000 and 1400 described above.

After a spatial location of the sensor and associated vehicle are determined in step 1808 or 1810, the location information is stored in a step 1812. A determination is then made in a step 1814 as to whether there are other vehicles to which the location information is to be sent. If there are, then in a step 1816, the location information is communicated to those vehicles, as appropriate, as was described with reference to vehicle group localization system 1700 with reference to FIG. 17. The process then returns to step 1814 and the information is communicated again until there are no more vehicles to send the location information to. Processing then returns to step 1802, as appropriate, to determine new localization information in the event the associated location-acquiring vehicle has moved relative to the physical-surface structure. Method 1800 and vehicle group localization system 1700 thus provide localization information to a plurality of vehicles, and is available so long as at least one of the vehicles is able to determine its location, such as by performing method 1800, or one of the methods referenced in method 1800.

Example 13

This section describes additional aspects and features of methods, systems, and apparatus presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A1. A method for spatial localization comprising:
    acquiring from a sensor supported by a vehicle an image of a portion of a physical surface configuration from a position spaced away from the physical surface configuration by a known distance;
    identifying features in the acquired image;
    associating identified features in the acquired image with identified features in a reference representation of the portion of the physical surface configuration;
    selecting a plurality of pairs of features in the acquired image having corresponding identified pairs of features in the reference representation;
        for each selected feature pair in the acquired image,
        determining an angle of view between the pair of features from the sensor,
        generating a three-dimensional geoarc associating the determined angle of view and the selected feature pair in the reference representation, and
        determining a selected portion of the geoarc disposed the known distance away from the portion of the physical surface configuration; and
    identifying locations where the selected portions of the geoarcs for the selected feature pairs overlap.

A2. The method of paragraph A1, where the reference representation is a two-dimensional representation extending along a ground plane, and wherein determining a selected portion of the geoarc includes determining a sensor plane at the known distance above the ground plane and identifying an intersection of the sensor plane with the geoarc.

A3. The method of paragraph A2, further comprising, for each selected feature pair, translating the intersection of the sensor plane with the geoarc onto the ground plane, and associating the identified locations where the selected portions of the geoarcs overlap, with corresponding locations on the reference representation.

A4. The method of paragraph A3, further comprising selecting a location on the reference representation corresponding to where the selected portions of the geoarcs overlap the most as the location on the reference representation corresponding to the location of the vehicle in the geoarc in the sensor plane.

A5. The method of paragraph A1, further comprising, for each selected feature pair, translating the selected portion of the geoarc onto the reference representation, and associating the identified locations where the selected portions of the geoarcs overlap with corresponding locations on the reference representation.

A6. The method of paragraph A1, wherein identifying locations where the selected portions of the geoarcs for the selected feature pairs overlap includes dividing an area of the reference representation of the portion of the physical surface configuration into a plurality of divisions, and identifying separately for each division locations in the respective division where the selected portions of the geoarcs for the selected feature pairs overlap.

A7. The method of paragraph A6, wherein identifying separately for each division locations in the respective division where the selected portions of the geoarcs for the selected feature pairs overlap includes identifying, for a plurality of the plurality of divisions concurrently, locations in the respective division where the selected portions of the geoarcs for the selected feature pairs overlap.

A8. The method of paragraph A7, where the sensor has a known field of view, and wherein dividing an area of the reference representation of the portion of the physical surface configuration into a plurality of divisions includes dividing the area of the reference representation of the portion of the physical surface configuration into the plurality of divisions each having an area less than the known field of view.

A9. The method of paragraph A8, wherein selecting a plurality of pairs of features in the acquired image having corresponding identified pairs of features in the reference representation includes selecting, for each division, a plurality of pairs of features in a known field of view of the acquired image including the division.

B10. A vehicle comprising:
a sensor configured to produce an image of a portion of a physical surface configuration from a position spaced away from the physical surface configuration by a known distance; and
a data processing system communicatively coupled to the sensor, the data processing system configured to:
store a reference representation of the portion of the physical surface configuration and features identified in the reference representation,
identify features in the acquired image;
associate identified features in the acquired image with identified features in the reference representation,
select a plurality of pairs of features in the acquired image having corresponding identified pairs of features in the reference representation, and
for each selected feature pair in the acquired image,
determine an angle of view between the pair of features from the sensor,
generate a three-dimensional geoarc associating the determined angle of view and the selected feature pair in the reference representation, and
determine a selected portion of the geoarc disposed the known distance away from the portion of the physical surface configuration; and
identify locations where the selected portions of the geoarcs for the selected feature pairs overlap.

B11. The vehicle of paragraph B10, where the reference representation is a two-dimensional representation extending along a ground plane, and wherein the data processing system is further configured to determine a sensor plane at the known distance above the ground plane and identify an intersection of the sensor plane with the geoarc.

B12. The vehicle of paragraph B11, wherein the data processing system is further configured to, for each selected feature pair, translate the intersection of the sensor plane onto the ground plane, and associate the identified locations where the selected portions of the geoarcs overlap, with corresponding locations on the reference representation.

B13. The vehicle of paragraph B12, wherein the data processing system is further configured to select a location on the reference representation corresponding to where the selected portions of the geoarcs overlap the most as the location on the reference representation corresponding to the location of the vehicle in the geoarc in the sensor plane.

B14. The vehicle of paragraph B10, wherein the data processing system is further configured to, for each selected feature pair, translate the selected portion of the geoarc onto the reference representation, and associate the identified locations where the selected portions of the geoarcs overlap with corresponding locations on the reference representation.

B15. The vehicle of paragraph B10, wherein the data processing system is further configured to divide an area of the reference representation of the portion of the physical surface configuration into a plurality of divisions, and identify separately for each division locations in the respective division where the selected portions of the geoarcs for the selected feature pairs overlap.

B16. The vehicle of paragraph B15, wherein the data processing system is further configured to identify, for a plurality of the plurality of divisions concurrently, locations in the respective division where the selected portions of the geoarcs for the selected feature pairs overlap.

B17. The vehicle of paragraph B16, where the sensor has a known field of view, and wherein the data processing system is further configured to divide the area of the reference representation of the portion of the physical surface configuration into the plurality of divisions each having an area less than the known field of view.

B18. The vehicle of paragraph B17, wherein the data processing system is further configured to select, for each division, a plurality of pairs of features in a known field of view of the acquired image including the division.

C19. A computer program product, comprising:
at least one computer readable storage medium having computer readable program instructions embodied therewith, the computer readable program instructions, when executed by a processor, configuring the processor to:
store a reference representation of the portion of the physical surface configuration and features identified in the reference representation;
receive and store an image produced by a sensor supported by a vehicle of a portion of a physical surface configuration from a position spaced away from the physical surface configuration by a known distance;
identify features in the received image;
associate identified features in the acquired image with identified features in the reference representation,
select a plurality of pairs of features in the received image having corresponding identified pairs of features in the reference representation,
for each selected feature pair in the received image,
determine an angle of view between the pair of features from the sensor,
generate a three-dimensional geoarc associating the determined angle of view and the selected feature pair in the reference representation, and
determine a selected portion of the geoarc disposed the known distance away from the portion of the physical surface configuration; and
identify locations where the selected portions of the geoarcs for the selected feature pairs overlap.

C20. The computer program product of paragraph C19, where the reference representation is a two-dimensional representation extending along a ground plane, and wherein the computer readable program instructions, when read by the processor further configure the processor to determine a sensor plane at the known distance above the ground plane and identify an intersection of the sensor plane with the geoarc.

C21. The computer program product of paragraph C20, wherein the computer readable program instructions, when read by the processor further configure the processor to, for each selected feature pair, translate the intersection of the sensor plane onto the ground plane, and associate the identified locations where the selected portions of the geoarcs overlap, with corresponding locations on the reference representation.

C22. The computer program product of paragraph C21, wherein the computer readable program instructions, when read by the processor further configure the processor to select a location on the reference representation corresponding to where the selected portions of the geoarcs overlap the most as the location on the reference representation corresponding to the location of the vehicle in the geoarc in the sensor plane.

C23. The computer program product of paragraph C19, wherein the computer readable program instructions, when read by the processor further configure the processor to, for each selected feature pair, translate the selected portion of the geoarc onto the reference representation, and associate the identified locations where the selected portions of the geoarcs overlap with corresponding locations on the reference representation.

C24. The computer program product of paragraph C19, wherein the computer readable program instructions, when read by the processor further configure the processor to divide an area of the reference representation of the portion of the physical surface configuration into a plurality of divisions, and identify separately for each division locations in the respective division where the selected portions of the geoarcs for the selected feature pairs overlap.

C25. The computer program product of paragraph C24, wherein the computer readable program instructions, when read by the processor further configure the processor to identify, for a plurality of the plurality of divisions concurrently, locations in the respective division where the selected portions of the geoarcs for the selected feature pairs overlap.

C26. The computer program product of paragraph C25, where the sensor has a known field of view, and wherein the computer readable program instructions, when read by the processor further configure the processor to divide the area of the reference representation of the portion of the physical surface configuration into the plurality of divisions each having an area less than the known field of view.

C27. The computer program product of paragraph C26, wherein the computer readable program instructions, when read by the processor further configure the processor to select, for each division, a plurality of pairs of features in a known field of view of the received image including the division.

D1. A method for spatial localizing comprising:
  acquiring from a sensor supported by a vehicle an image of a portion of a physical surface configuration from a position spaced away from the physical surface configuration;
  identifying features in the acquired image;
  associating identified features in the acquired image with identified features in a three-dimensional reference representation of the portion of the physical surface configuration, the three-dimensional reference representation being defined in a three-dimensional space of volume elements (voxels);
  selecting a plurality of pairs of features in the acquired image having corresponding identified pairs of features in the reference representation;
    for each selected feature pair in the acquired image,
    determining an angle of view between the pair of features from the sensor,
    generating a three-dimensional geoarc associating the determined angle of view and the selected feature pair in the reference representation, and
    identifying voxels that are included in the generated geoarc;
    summing for each identified voxel the number of generated geoarcs in which the voxel is included; and
    determining which identified voxel or voxels are included in the highest number of geoarcs.

D2. The method of paragraph D1, wherein determining an angle of view between the pair of features from the sensor includes determining a range of angles of view between the pair of features from the sensor, the range of angles of view extending between a high angle of view and a low angle of view, and generating a three-dimensional geoarc includes generating an inner geoarc surface based on the high angle of view and generating an outer geoarc surface based on the low angle of view.

D3. The method of paragraph D2, wherein identifying voxels that are included in the generated geoarc includes determining which voxels are in the volume of space bounded by the outer geoarc surface and the inner geoarc surface.

D4. The method of paragraph D3, wherein determining which voxels are in the volume of space bounded by the outer geoarc surface and the inner geoarc surface includes determining, for each considered voxel, if a representative point within the considered voxel is in the volume of space bounded by the outer geoarc surface and the inner geoarc surface.

D5. The method of paragraph D1, where the three-dimensional space is defined by a first coordinate system having a first coordinate origin, and wherein generating a three-dimensional geoarc associating the determined angle of view and the selected feature pair in the reference representation includes generating the three-dimensional geoarc in the first coordinate system, identifying voxels that are included in the generated geoarc includes transforming coordinates of the geoarc to a respective coordinate system having a respective coordinate origin centered between the associated identified feature pair, and transforming coordinates of the voxel to the respective coordinate system.

D6. The method of paragraph D5, wherein transforming coordinates of the geoarc to a respective coordinate system includes translating the coordinates of the geoarc by the coordinate values of the point midway between the associated identified feature pair and rotating the geoarc so the axes of the respective coordinate system align with the first coordinate axes.

D7. The method of paragraph D6, wherein identifying voxels that are included in the generated geoarc includes determining if each transformed voxel is disposed a distance from the respective coordinate origin that is between a radius of the transformed inner geoarc surface and a radius of the transformed outer geoarc surface.

D8. The method of paragraph D1, wherein identifying voxels that are included in the generated geoarc includes selecting a portion of the three-dimensional space, and determining, for each voxel in the selected portion of the three-dimensional space, whether the voxel is included in the generated geoarc.

D9. The method of paragraph D8, wherein selecting a portion of the three-dimensional space includes summing for each voxel the number of generated geoarcs in which the voxel is included for each feature pair, and revising the size of the selected portion of the three-dimensional space based at least in part on the sums for each voxel of the number of generated geoarcs in which the voxel is included.

D10. The method of paragraph D1, wherein determining for each voxel if the voxel is included in the generated geoarc includes selecting a voxel size for the voxels of the three-dimensional space, and determining, for each voxel of the selected voxel size whether the voxel is included in the generated geoarc.

D11. The method of paragraph D10, wherein selecting a portion of the three-dimensional space includes summing for each voxel the number of generated geoarcs in which the voxel is included for each feature pair, and revising the voxel size based at least in part on the sums for each voxel of the number of generated geoarcs in which the voxel is included.

D12. The method of paragraph D1, wherein determining for each voxel if the voxel is included in the generated geoarc includes dividing the three-dimensional space into a plurality of separate portions, and identifying, concurrently for each of a plurality of the plurality of separate portions, whether the voxels in the respective separate portion are included in the generated geoarc.

E1. A vehicle comprising:
a sensor configured to produce an image of a portion of a physical surface configuration from a position spaced away from the physical surface configuration; and
a data processing system communicatively coupled to the sensor, the data processing system configured to:
acquire from the sensor an image of a portion of a physical surface configuration from a position spaced away from the physical surface configuration;
identify features in the acquired image;
associate identified features in the acquired image with identified features in a three-dimensional reference representation of the portion of the physical surface configuration, the three-dimensional reference representation being defined in a three-dimensional space of volume elements (voxels);
select a plurality of pairs of features in the acquired image having corresponding identified pairs of features in the reference representation;
for each selected feature pair in the acquired image,
determine an angle of view between the pair of features from the sensor,
generate a three-dimensional geoarc associating the determined angle of view and the selected feature pair in the reference representation, and
identify voxels that are included in the generated geoarc;
sum for each identified voxel the number of generated geoarcs in which the voxel is included; and
determine which identified voxel or voxels are included in the highest number of geoarcs.

E2. The vehicle of paragraph E1, wherein the data processing system is further configured to determine a range of angles of view between the pair of features from the sensor, the range of angles of view extending between a high angle of view and a low angle of view, and generate an inner geoarc surface based on the high angle of view and generate an outer geoarc surface based on the low angle of view.

E3. The vehicle of paragraph E2, wherein the data processing system is further configured to determine which voxels are in the volume of space bounded by the outer geoarc surface and the inner geoarc surface.

E4. The vehicle of paragraph E3, wherein the data processing system is further configured to determine, for each considered voxel, if a representative point within the considered voxel is in the volume of space bounded by the outer geoarc surface and the inner geoarc surface.

E5. The vehicle of paragraph E1, where the three-dimensional space is defined by a first coordinate system having a first coordinate origin, and wherein the data processing system is further configured to generate the three-dimensional geoarc in the first coordinate system, transform coordinates of the geoarc to a respective coordinate system having a respective coordinate origin centered between the associated identified feature pair, and transform coordinates of the voxel to the respective coordinate system.

E6. The vehicle of paragraph E5, wherein the data processing system is further configured to translate the coordinates of the geoarc by the coordinate values of the point midway between the associated identified feature pair and rotate the geoarc so the axes of the respective coordinate system align with the first coordinate axes.

E7. The vehicle of paragraph E6, wherein the data processing system is further configured to determine if each transformed voxel is disposed a distance from the respective coordinate origin that is between a radius of the transformed inner geoarc surface and a radius of the transformed outer geoarc surface.

E8. The vehicle of paragraph E1, wherein the data processing system is further configured to select a portion of the three-dimensional space, and determine, for each voxel in the selected portion of the three-dimensional space, whether the voxel is included in the generated geoarc.

E9. The vehicle of paragraph E8, wherein the data processing system is further configured to sum for each voxel the number of generated geoarcs in which the voxel is included for each feature pair, and revise the size of the selected portion of the three-dimensional space based at least in part on the sums for each voxel of the number of generated geoarcs in which the voxel is included.

E10. The vehicle of paragraph E1, wherein the data processing system is further configured to select a voxel size for the voxels of the three-dimensional space, and determine, for each voxel of the selected size whether the voxel is included in the generated geoarc.

E11. The vehicle of paragraph E10, wherein the data processing system is further configured to sum for each voxel the number of generated geoarcs in which the voxel is included for each feature pair, and revise the voxel size based at least in part on the sums for each voxel of the number of generated geoarcs in which the voxel is included.

E12. The vehicle of paragraph E1, wherein the data processing system is further configured to divide the three-dimensional space into a plurality of separate portions, and identify, concurrently for each of a plurality of the plurality of separate portions, whether the voxels in the respective separate portion are included in the generated geoarc.

F1. A computer program product, comprising:
at least one computer readable storage medium having computer readable program instructions embodied therewith, the computer readable program instructions, when executed by a processor, configuring the processor to:
acquire from a sensor supported by a vehicle an image of a portion of a physical surface configuration from a position spaced away from the physical surface configuration;
identify features in the acquired image;
associate identified features in the acquired image with identified features in a three-dimensional reference representation of the portion of the physical surface configuration, the three-dimensional reference representation being defined in a three-dimensional space of volume elements (voxels);
select a plurality of pairs of features in the acquired image having corresponding identified pairs of features in the reference representation;
for each selected feature pair in the acquired image,
determine an angle of view between the pair of features from the sensor,
generate a three-dimensional geoarc associating the determined angle of view and the selected feature pair in the reference representation, and
identify voxels that are included in the generated geoarc;
sum for each identified voxel the number of generated geoarcs in which the voxel is included; and
determine which identified voxel or voxels are included in the highest number of geoarcs.

F2. The computer program product of paragraph F1, wherein the computer readable program instructions, when read by the processor further configure the processor to determine a range of angles of view between the pair of features from the sensor, the range of angles of view extending between a high angle of view and a low angle of view, and generate an inner geoarc surface based on the high angle of view and generate an outer geoarc surface based on the low angle of view.

F3. The computer program product of paragraph F2, wherein the computer readable program instructions, when read by the processor further configure the processor to determine which voxels are in the volume of space bounded by the outer geoarc surface and the inner geoarc surface.

F4. The computer program product of paragraph F3, wherein the computer readable program instructions, when read by the processor further configure the processor to determine, for each considered voxel, if a representative point within the considered voxel is in the volume of space bounded by the outer geoarc surface and the inner geoarc surface.

F5. The computer program product of paragraph F1, where the three-dimensional space is defined by a first coordinate system having a first coordinate origin, and wherein the computer readable program instructions, when read by the processor further configure the processor to generate the three-dimensional geoarc in the first coordinate system, transform coordinates of the geoarc to a respective coordinate system having a respective coordinate origin centered between the associated identified feature pair, and transform coordinates of the voxel to the respective coordinate system.

F6. The computer program product of paragraph F5, wherein the computer readable program instructions, when read by the processor further configure the processor to translate the coordinates of the geoarc by the coordinate values of the point midway between the associated identified feature pair and rotate the geoarc so the axes of the respective coordinate system align with the first coordinate axes.

F7. The computer program product of paragraph F6, wherein the computer readable program instructions, when read by the processor further configure the processor to determine if each transformed voxel is disposed a distance from the respective coordinate origin that is between a radius of the transformed inner geoarc surface and a radius of the transformed outer geoarc surface.

F8. The computer program product of paragraph F1, wherein the computer readable program instructions, when read by the processor further configure the processor to select a portion of the three-dimensional space, and determine, for each voxel in the selected portion of the three-dimensional space, whether the voxel is included in the generated geoarc.

F9. The computer program product of paragraph F8, wherein the computer readable program instructions, when read by the processor further configure the processor to sum for each voxel the number of generated geoarcs in which the voxel is included for each feature pair, and revise the size of the selected portion of the three-dimensional space based at least in part on the sums for each voxel of the number of generated geoarcs in which the voxel is included.

F10. The computer program product of paragraph F1, wherein the computer readable program instructions, when read by the processor further configure the processor to select a voxel size for the voxels of the three-dimensional space, and determine, for each voxel of the selected size whether the voxel is included in the generated geoarc.

F11. The computer program product of paragraph F10, wherein the computer readable program instructions, when read by the processor further configure the processor to sum for each voxel the number of generated geoarcs in which the voxel is included for each feature pair, and revise the voxel size based at least in part on the sums for each voxel of the number of generated geoarcs in which the voxel is included.

F12. The computer program product of paragraph F1, wherein the computer readable program instructions, when read by the processor further configure the processor to divide the three-dimensional space into a plurality of separate portions, and identify, concurrently for each of a plurality of the plurality of separate portions, whether the voxels in the respective separate portion are included in the generated geoarc.

Advantages, Features, Benefits

The different embodiments of the spatial localization systems, method, and apparatus described herein provide several advantages over known solutions for locating an image sensor and supporting vehicle. The embodiments of spatial localization system, methods, and apparatuses disclosed herein use a passive camera-based approach, but unlike existing passive camera methods they do not require estimation of 3D models, finding high accuracy correspondences for constellations of features, warping of images, or recognition of objects in the scene. Instead, only relative angles between simple features such as edges, corners, peaks, etc. need to be measured in an image and only a small subset of the detected features need to be matched with a database of mapped features for accurate 2D or 3D spatial and geo-localization relative to a physical surface configuration, such as a 2D or 3D object or scene. The properties of the spatial localization systems, methods, and apparatuses makes it more accurate, robust, and efficient than existing image based methods which try to match images or constellations of features with maps. Thus, the illustrative embodiments described herein are particularly useful for for devices that are not GPS enabled or are in a position where GPS is not available. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

I claim:
1. A method for spatial localization comprising:
acquiring from a sensor supported by a vehicle an image of a portion of a physical surface configuration extend- ing along a ground plane from a position spaced away from the ground plane by a known distance;
identifying features in the acquired image;
associating identified features in the acquired image with identified features in a two-dimensional reference representation of the portion of the physical surface configuration;
selecting a plurality of pairs of features in the acquired image having corresponding identified pairs of features in the reference representation;
for each selected feature pair in the acquired image,
determining an angle of view between the pair of features from the sensor,
generating a three-dimensional geoarc associating the determined angle of view and the selected feature pair in the reference representation, and
determining a selected portion of the geoarc disposed the known distance away from the portion of the physical surface configuration by determining a sensor plane at the known distance above the ground plane and identifying an intersection of the sensor plane with the geoarc; and
identifying locations where the selected portions of the geoarcs for the selected feature pairs overlap.

2. The method of claim 1, further comprising, for each selected feature pair, translating the intersection of the sensor plane with the geoarc onto the ground plane, and associating the identified locations where the selected portions of the geoarcs overlap, with corresponding locations on the reference representation.

3. The method of claim 2, further comprising selecting a location on the reference representation corresponding to where the selected portions of the geoarcs overlap the most as the location on the reference representation corresponding to the location of the vehicle in the sensor plane.

4. The method of claim 1, further comprising, for each selected feature pair, translating the selected portion of the geoarc onto the reference representation, and associating the identified locations where the selected portions of the geoarcs overlap with corresponding locations on the reference representation.

5. The method of claim 1, wherein identifying locations where the selected portions of the geoarcs for the selected feature pairs overlap includes dividing an area of the reference representation of the portion of the physical surface configuration into a plurality of divisions, and identifying separately for each division locations in the respective division where the selected portions of the geoarcs for the selected feature pairs overlap.

6. The method of claim 5, wherein identifying separately for each division locations in the respective division where the selected portions of the geoarcs for the selected feature pairs overlap includes identifying, for a plurality of the plurality of divisions concurrently, locations in the respective division where the selected portions of the geoarcs for the selected feature pairs overlap.

7. The method of claim 6, wherein the sensor has a known field of view, and wherein dividing an area of the reference representation of the portion of the physical surface configuration into a plurality of divisions includes dividing the area of the reference representation of the portion of the physical surface configuration into the plurality of divisions each having an area less than the known field of view.

8. A vehicle comprising:
a sensor configured to produce an image of a portion of a physical surface configuration extending along a ground plane from a position spaced away from the ground plane by a known distance; and
a data processing system communicatively coupled to the sensor, the data processing system configured to:
store a two-dimensional reference representation of the portion of the physical surface configuration extending along the ground plane and features identified in the reference representation,
identify features in the produced image;
associate identified features in the produced image with identified features in the reference representation,
select a plurality of pairs of features in the produced image having corresponding identified pairs of features in the reference representation, and
for each selected feature pair in the produced image,
determine an angle of view between the pair of features from the sensor,
generate a three-dimensional geoarc associating the determined angle of view and the selected feature pair in the reference representation, and
determine a selected portion of the geoarc disposed the known distance away from the portion of the physical surface configuration by determining a sensor plane at the known distance above the ground plane and identifying an intersection of the sensor plane with the geoarc; and
identify locations where the selected portions of the geoarcs for the selected feature pairs overlap.

9. The vehicle of claim 8, wherein the data processing system is further configured to, for each selected feature pair, translate the intersection of the sensor plane with the geoarc onto the ground plane, and associate the identified locations where the selected portions of the geoarcs overlap, with corresponding locations on the reference representation.

10. The vehicle of claim 9, wherein the data processing system is further configured to select a location on the reference representation corresponding to where the selected portions of the geoarcs overlap the most as the location on the reference representation corresponding to the location of the vehicle in the sensor plane.

11. The vehicle of claim 8, wherein the data processing system is further configured to, for each selected feature pair, translate the selected portion of the geoarc onto the reference representation, and associate the identified locations where the selected portions of the geoarcs overlap with corresponding locations on the reference representation.

12. The vehicle of claim 8, wherein the data processing system is further configured to divide an area of the reference representation of the portion of the physical surface configuration into a plurality of divisions, and identify separately for each division locations in the respective division where the selected portions of the geoarcs for the selected feature pairs overlap.

13. The vehicle of claim 12, wherein the data processing system is further configured to identify, for a plurality of the plurality of divisions concurrently, locations in the respective division where the selected portions of the geoarcs for the selected feature pairs overlap.

14. The vehicle of claim 13, wherein the sensor has a known field of view, and wherein the data processing system is further configured to divide the area of the reference representation of the portion of the physical surface configuration into the plurality of divisions each having an area less than the known field of view.

15. A computer program product, comprising:
at least one non-transitory computer readable storage medium having computer readable program instructions embodied therewith, the computer readable program instructions, when executed by a processor, configuring the processor to:
  store a two-dimensional reference representation of a portion of a physical surface configuration extending along a ground plane and features identified in the reference representation;
  receive and store an image produced by a sensor supported by a vehicle of a portion of the physical surface configuration from a position spaced away from the ground plane by a known distance;
  identify features in the received image;
  associate identified features in the received image with identified features in the reference representation,
  select a plurality of pairs of features in the received image having corresponding identified pairs of features in the reference representation,
  for each selected feature pair in the received image,
    determine an angle of view between the pair of features from the sensor,
    generate a three-dimensional geoarc associating the determined angle of view and the selected feature pair in the reference representation, and
    determine a selected portion of the geoarc disposed the known distance away from the portion of the physical surface configuration by determining a sensor plane at the known distance above the ground plane and identifying an intersection of the sensor plane with the geoarc; and
  identify locations where the selected portions of the geoarcs for the selected feature pairs overlap.

16. The computer program product of claim 15, wherein the computer readable program instructions, when read by the processor further configure the processor to, for each selected feature pair, translate the intersection of the sensor plane onto the ground plane, and associate the identified locations where the selected portions of the geoarcs overlap, with corresponding locations on the reference representation.

17. The computer program product of claim 15, wherein the computer readable program instructions, when read by the processor further configure the processor to divide an area of the reference representation of the portion of the physical surface configuration into a plurality of divisions, and identify separately for each division locations in the respective division where the selected portions of the geoarcs for the selected feature pairs overlap.

* * * * *